US011901684B2

(12) United States Patent
Ocegueda Gallaga et al.

(10) Patent No.: US 11,901,684 B2
(45) Date of Patent: Feb. 13, 2024

(54) ELECTRICAL AND MECHANICAL COUPLING SYSTEMS FOR ARTIFICIAL POWERED TREES AND ASSOCIATED METHODS

(71) Applicant: BELGRAVIA WOOD LIMITED, Tortola (VG)

(72) Inventors: Victor Hugo Ocegueda Gallaga, Baja California (MX); Kevin Zhang, Xinxiang (CN); Chi Yin Alan Leung, Hong Kong (CN); May Kong Wong, Gunangdong (CN); Sunny Qiu, Gunangdong (CN)

(73) Assignee: BELGRAVIA WOOD LIMITED, Tortola (VG)

( * ) Notice: Subject to any disclaimer, the term of this patent is extended or adjusted under 35 U.S.C. 154(b) by 0 days.

(21) Appl. No.: 17/425,862

(22) PCT Filed: Jan. 25, 2020

(86) PCT No.: PCT/US2020/015118
§ 371 (c)(1),
(2) Date: Jul. 26, 2021

(87) PCT Pub. No.: WO2020/154710
PCT Pub. Date: Jul. 30, 2020

(65) Prior Publication Data

US 2022/0181829 A1 Jun. 9, 2022

(30) Foreign Application Priority Data

Jan. 25, 2019 (CN) ......................... 201920140483.3
May 6, 2019 (CN) ......................... 201920636603.9

(51) Int. Cl.
*H01R 35/04* (2006.01)
*A47G 33/06* (2006.01)
(Continued)

(52) U.S. Cl.
CPC ............. *H01R 35/04* (2013.01); *A47G 33/06* (2013.01); *F21V 23/06* (2013.01); *H01R 13/62* (2013.01);
(Continued)

(58) Field of Classification Search
CPC ...... H01R 35/04; H01R 13/62; H01R 13/642; H01R 3/26; A47G 33/06; A47G 2200/08
(Continued)

(56) References Cited

U.S. PATENT DOCUMENTS

70 A * 10/1836 Lombard, Jr. .......... G09F 11/12
40/528
920,546 A * 5/1909 Cranmer .................... B60J 1/06
296/87
(Continued)

FOREIGN PATENT DOCUMENTS

CN 209769986 U 12/2019
CN 210052945 U 2/2020

*Primary Examiner* — Alexander Gilman
(74) *Attorney, Agent, or Firm* — TROUTMAN PEPPER HAMILTON SANDERS LLP; Ryan A. Schneider; Christopher C. Close, Jr.

(57) ABSTRACT

A connection system to facilitate the mechanical coupling, and the transfer of electrical power between, trunk sections of an artificial tree is disclosed. The connection system can include a mechanical coupling system having a guiding surface and a guiding slot on a first trunk section and a guiding protrusion disposed inside a second trunk section. Insertion of the first trunk section into the second trunk section and thus contact of the guiding protrusion against the guiding surface can cause the first trunk section to rotate relative the second trunk section until a predetermined rotational alignment is reached, aligning electrical contacts of first and second electrical connectors, each of which is attached to an outer wall of a respective trunk section. The electrical contacts of the first and second electrical connec-
(Continued)

tors can establish electrical communication between the first and second electrical connectors, and thus between the first and second trunk sections.

19 Claims, 26 Drawing Sheets

(51) Int. Cl.

| | |
|---|---|
| ***F21V 23/06*** | (2006.01) |
| ***H01R 13/62*** | (2006.01) |
| ***H01R 13/642*** | (2006.01) |
| ***H01R 43/26*** | (2006.01) |
| *F21W 121/04* | (2006.01) |
| *H01R 107/00* | (2006.01) |

(52) U.S. Cl.
CPC ........... *H01R 13/642* (2013.01); *H01R 43/26* (2013.01); *A47G 2200/08* (2013.01); *F21W 2121/04* (2013.01); *H01R 2107/00* (2013.01)

(58) Field of Classification Search
USPC .......................................................... 439/266
See application file for complete search history.

(56) References Cited

U.S. PATENT DOCUMENTS

| | | | | |
|---|---|---|---|---|
| 8,863,416 | B2 * | 10/2014 | Leung | H01R 33/06 40/442 |
| 8,993,077 | B2 | 3/2015 | Schooley | |
| 9,209,546 | B1 * | 12/2015 | Gibboney, Jr. | H01R 13/50 |
| 9,220,361 | B1 * | 12/2015 | Chen | F21V 23/06 |
| 9,431,765 | B2 * | 8/2016 | Tao | A47G 33/06 |
| 9,577,376 | B1 * | 2/2017 | Tsai | A47G 33/06 |
| 9,648,919 | B2 * | 5/2017 | Chen | H01R 43/26 |
| 9,700,169 | B2 * | 7/2017 | Wong | F21S 4/20 |
| 9,839,315 | B2 * | 12/2017 | Leung | A47G 33/06 |
| 9,883,706 | B2 * | 2/2018 | Chen | A47G 33/06 |
| 9,894,949 | B1 * | 2/2018 | Chen | F21S 4/10 |
| 9,960,558 | B2 * | 5/2018 | Ocegueda Gallaga | H01R 33/205 |
| 10,085,504 | B2 * | 10/2018 | Chen | H01R 13/502 |
| 10,206,530 | B2 * | 2/2019 | Chen | A47G 33/06 |
| 10,305,237 | B1 * | 5/2019 | Li | H01R 13/33 |
| 10,333,252 | B1 * | 6/2019 | Altamura | H01R 24/20 |
| 10,498,074 | B2 * | 12/2019 | Gibboney, Jr. | H01R 13/6272 |
| 10,574,009 | B2 * | 2/2020 | Ocegueda Gallaga | H01R 33/205 |
| 10,615,555 | B1 * | 4/2020 | Altamura | H01R 33/06 |
| 10,727,629 | B1 * | 7/2020 | Altamura | H01R 24/20 |
| 10,842,306 | B2 * | 11/2020 | Leung | A47G 33/06 |
| 10,989,374 | B1 * | 4/2021 | Chen | F21V 23/06 |
| 11,070,017 | B1 * | 7/2021 | Altamura | H01R 13/631 |
| 11,525,565 | B1 * | 12/2022 | Liu | F21V 33/0028 |
| 2006/0164834 | A1 * | 7/2006 | Kao | A47G 33/06 362/249.01 |
| 2012/0301636 | A1 | 11/2012 | Schooley | |
| 2013/0108808 | A1 * | 5/2013 | Leung | H01R 13/10 439/135 |
| 2013/0163231 | A1 * | 6/2013 | Chen | A47G 33/06 29/825 |
| 2013/0301247 | A1 | 11/2013 | Chen | |
| 2015/0079850 | A1 * | 3/2015 | Tao | A47G 33/06 439/680 |
| 2015/6079850 | | 3/2015 | Tao | |
| 2015/0272250 | A1 | 10/2015 | Chen | |
| 2015/0374159 | A1 * | 12/2015 | McRae | A47G 33/0872 439/108 |
| 2016/0081508 | A1 * | 3/2016 | Wong | F21S 4/10 362/123 |
| 2017/0007060 | A1 * | 1/2017 | Loomis | F21V 33/0028 |
| 2017/0256898 | A1 | 9/2017 | Ocegueda Gallaga et al. | |
| 2019/0089094 | A1 * | 3/2019 | Gibboney, Jr. | H01R 13/6271 |
| 2019/0386440 | A1 * | 12/2019 | Leung | H01R 31/00 |
| 2021/0007525 | A1 * | 1/2021 | Loomis | F21V 23/06 |
| 2021/0030186 | A1 * | 2/2021 | Liu | F21V 23/002 |
| 2022/0181829 | A1 * | 6/2022 | Ocegueda Gallaga | H01R 13/62 |

* cited by examiner

ELECTRICAL AND MECHANICAL COUPLING SYSTEMS FOR ARTIFICIAL POWERED TREES AND ASSOCIATED METHODS

CROSS-REFERENCE TO RELATED APPLICATIONS

This application is a national stage application, filed under 35 U.S.C. § 371, of International Patent Application No. PCT/US2020/015118, filed on 25 Jan. 2020, which claims benefit under 35 U.S.C. § 119(a), of Chinese Patent App. No. 2019201404833, filed 25 Jan. 2019, and Chinese Patent App. No. 2019206366039, filed 6 May 2019 the entire contents and substance of which are incorporated herein by reference in their entirety.

FIELD OF THE INVENTION

Embodiments of the present disclosure relate generally to power transfer systems, and, more particularly, to power transfer systems for use with artificial trees, such as artificial Christmas trees.

BACKGROUND

As part of the celebration of the Christmas season, many people traditionally bring a pine or evergreen tree into their home and decorate it with ornaments, lights, garland, tinsel, and the like. Natural trees, however, can be quite expensive and are recognized by some as a waste of environmental resources. In addition, natural trees can be messy, leaving both sap and needles behind after removal, and requiring water to prevent drying out and becoming a fire hazard. Natural trees must be decorated, and at the end of the Christmas season the decorations must be removed. Because the needles have likely dried and may be quite sharp by this time, removal of the decorations can be a painful process. In addition, natural trees often are disposed in landfills, further polluting these overflowing environments.

To overcome the disadvantages of a natural Christmas tree, yet still incorporate a tree into the holiday celebration, a great variety of artificial Christmas trees are available. For the most part, these artificial trees must be assembled for use and disassembled after use. Artificial trees have the advantage of being usable over a period of years and thereby eliminate the annual expense of purchasing live trees for the short holiday season. Further, they help reduce the chopping down of trees for a temporary decoration and the subsequent disposal, typically in a landfill, of those trees.

Generally, artificial Christmas trees comprise a multiplicity of branches each formed of a plurality of plastic needles held together by twisting a pair of wires about them. In other instances, the branches are formed by twisting a pair of wires about an elongated sheet of plastic material having a large multiplicity of transverse slits. In still other artificial Christmas trees, the branches are formed by injection molding of plastic.

Irrespective of the form of the branch, many existing designs of artificial Christmas trees each comprise a plurality of trunk sections connectable to one another. For example, in many designs, a first and second trunk section each comprise an elongate body. A first end of the body includes an extending portion (e.g., a male end) and a second end of the body includes a receiving portion (e.g., a female end). Typically, the body is a cylinder. Near the first end the body tapers slightly to reduce the diameter of the body. In other words, the diameter of the second end (i.e., the receiving portion), is larger than the diameter of the first end (i.e., the extending portion). To mechanically connect the trunk sections, the second end of a second trunk section receives the first end of a first trunk section. For example, the tapered end of the first trunk section is inserted into the non-tapered end of the second trunk section. Some existing designs include electrical connectors that each have electrical contacts. For example, referring to the previous example, some designs include an electrical connector having electrical prongs positioned on or in the extending portion of the first end and an electrical connector having electrical contacts positioned in the receiving portion of the second end, such that the two electrical connectors mate to form an electrical connection between the first and second trunk sections. In this manner, a plurality of trunk sections can be connected to assemble a tree.

A difficulty often encountered during assembly, however, is the rotational alignment of the trunk sections such that the electrical connectors properly align. In some designs, the electrical prongs of one trunk section must be rotationally aligned with, and inserted into, electrical slots (e.g., female electrical contacts) in another trunk section, and often, the electrical prongs can engage the electrical slots only if the trunk sections are in a particular rotational alignment. This alignment process can be frustrating because it can be difficult for an assembler to judge whether the prongs will engage the slots when trunk sections are joined together. It may therefore take several attempts before an assembler can electrically connect two trunk sections. In other existing designs, the electrical prongs of one trunk section can engage the electrical contacts of an adjacent trunk section at a plurality of rotational alignments. For example, in some designs, the first trunk section can freely rotate in relation to the second trunk section while the first and section trunk sections are electrically connected. In some designs, the first trunk section can freely rotate in full rotation with respect to the second trunk section, and in some designs, the first trunk section can freely rotate in partial rotation (i.e., less than 360°) with respect to the second trunk section. It may be undesirable, however, for either partial or full rotation to occur, as free rotation of adjacent trunk sections may permit misalignment of ornaments and/or other decorations. Such misalignment may be exacerbated if the tree is inserted into, and rotated by, a rotating base or a similar device.

Further, it may be difficult to manufacture trunk sections having tolerances that permit easy assembly and disassembly without also permitting a trunk section to wobble with respect to an adjacent tree section. That is, if an extending portion of a first trunk section has an outer diameter that is too similar to an inner diameter of a receiving portion of a second trunk section, it may be difficult for an assembler to assemble and/or disassemble the tree. Alternately, if the extending portion of the first trunk section has an outer diameter that is too small with respect to the inner diameter of the receiving portion of the second trunk section, the first trunk section may be permitted to wobble or shift with respect to the second trunk section. Thus, any jostling of the tree may cause one or more portions of the tree to shift, which may result in tree ornaments or other decorations being knocked from the tree. This may result in damaged tree ornaments or other decorations, damage to the tree itself, or injury to assemblers and/or decorators.

What is needed, therefore, is an artificial tree that allows a user to connect neighboring trunk sections without the need to rotationally align the trunk sections but also provides a secure mechanical coupling of the neighboring trunk sections such that the neighboring trunk sections cannot rotate once assembled. Embodiments of the present disclosure address these and other needs, as will become apparent upon reading the description below in conjunction with the drawings.

BRIEF SUMMARY

Briefly described, embodiments of the present disclosure comprise a trunk connection system power to facilitate secure mechanical coupling of adjacent trunk sections of an artificial tree and the transfer of electrical power between the adjacent trunk sections. The trunk connection system can advantageously enable neighboring trunk sections to be electrically connected and mechanically coupled without the need to rotationally align the trunk sections during assembly and can also provide a secure connection between the neighboring trunk sections in a single rotational alignment. Embodiments of the present disclosure can therefore facilitate assembly of an artificial tree, reducing user frustration during the assembly process.

The disclosed power transfer systems can comprise a first power distribution subsystem disposed within or attached along a first trunk section of an artificial tree. The power transfer system can further comprise a second power distribution subsystem disposed within or attached along a second trunk section of an artificial tree. The first power distribution subsystem can comprise a male end with first electrical contacts and the second power distribution subsystem can comprise a female end with second electrical contacts. The first electrical contacts can be brought into contact with the second electrical contacts to conduct electricity between the power distribution subsystems, and, therefore, between the trunk sections of the tree.

To enable neighboring trunk sections to be mechanically coupled without the need to rotationally align the trunk sections, the male end can comprise an extending portion and a male mechanical coupler that can include one or more angled guiding surfaces, a guiding channel, and a tip. The female end can comprise a receiving portion and a female mechanical coupler that can include a guiding protrusion and an insert. The insert can be configured to receive at least a portion of the tip of the male mechanical coupler, and the insert can include a wire channel configured to retain at least a portion of one or more wires attached to a female electrical connector of the female end.

When the male mechanical coupler and the extending portion of the male end are inserted into the receiving portion of the female end, one of the guiding surfaces of the male mechanical coupler can contact the guiding protrusion of the female mechanical coupler. The angled disposition of the guiding surface can direct the guiding protrusion toward the guiding channel of the male mechanical coupler, causing the male end to rotate with respect to the female end. Upon alignment of the guiding protrusion and the guiding channel, gravity or another force can cause the guiding protrusion to traverse the guiding channel, such that the male end and female end become mechanically coupled.

The male end can comprise a male end electrical connector, and the female end can comprise a female end electrical connector. When the guiding protrusion and guiding channel become aligned, electrical contacts of the male end electrical connector can become aligned with electrical contacts of the female end electrical connector, and when the male end and female end become mechanically coupled, the male end electrical connector can establish electrical communication with the female end electrical connector such that electricity can be transferred between the male end and the female end.

The present disclosure includes an artificial tree comprising a plurality of trunk sections. The trunk sections can form a trunk of the artificial tree. A first power distribution subsystem can be disposed partially within a first trunk section of the plurality of trunk sections or the first power distribution system can be attached along the first trunk section. The first power distribution subsystem can comprise a male end having a male mechanical coupler and a male end electrical connector. A second power distribution subsystem can be disposed partially within a second trunk section of the plurality of trunk sections, or the second power distribution system can be attached along the second trunk section. The second power distribution subsystem can comprise a female mechanical coupler and a female end electrical connector. The male coupler can be configured to engage the female coupler to cause the first trunk section to rotate relative the second trunk section until electrical contacts of the male end electrical connector align with respective electrical contacts of the female end electrical connector. Once aligned, the male and female mechanical couplers can mechanically couple (i.e., detachably attach) the first and second trunk sections, simultaneously causing the electrical contacts of the male end electrical connector to engage the electrical contacts of the female end electrical connector, establishing electrical communication between the first and second power distribution subsystems.

In this manner, the male and female electrical connectors may house at least a portion of the first and/or second power distribution subsystems externally from the trunk sections (e.g., such that the first and/or second power distribution subsystems are not entirely disposed within the trunk sections), which may provide easier access to or make it easier to replace wiring and other components of the first and second power distribution subsystems without distracting from the aesthetics of the artificial tree. Additionally, the male and female mechanically couplers may provide an artificial tree in which neighboring trunk sections can be coupled or attached without rotationally aligning the trunk sections, and the male and female mechanical couplers may also cause the trunk sections to form a predetermined rotational alignment such that the male end and female end electrical connectors can establish electrical communication between the first and second power distribution subsystems. The artificial tree can include an outlet can be disposed on one or more trunk sections, and the outlet can be configured to provide electrical power to a strand of lights. Further, the artificial tree can include a power cord can be configured to engage a wall outlet and provide power to the first power distribution subsystem and the second power distribution subsystem.

The present disclosure further comprises a system for connecting trunk sections of an artificial tree. The system can comprise a first trunk section having a male end and including a male mechanical coupler and a first power distribution subsystem including a male end electrical connector. The system can further comprise a second trunk section having a female end and including a female mechanical coupler and a second power distribution subsystem having a female end electrical connector. One or more electrical contacts of the first power distribution subsystem can engage one or more electrical contacts of the second power distribution subsystem to conduct electricity between the first power distribution subsystem and the second power distribution subsystem. The one or more electrical contacts of the first power distribution subsystem can be configured to engage the one or more electrical contacts of the second power distribution subsystem in a single configuration, where the single configuration corresponds to a single rotational alignment between the first trunk section and the second trunk section.

The present disclosure further comprises a mechanical coupler system for detachably attaching and rotationally aligning neighboring trunk sections of an artificial tree. The coupler system can comprise a male component disposed on an end of a first trunk section, and the male component can have an angled guiding surface and a guiding channel. The coupler system can further comprise a female component disposed on an opposite end of the first trunk section and/or on an end of a second trunk section. The female component can have a guiding protrusion configured to extend from the inner wall of the corresponding trunk section, and the guiding protrusion can be dimensioned to freely traverse the guiding channel. The female component may include an insert having a receiving portion for receiving a tip of the male component. The insert can be configured to be affixed within the respective trunk section. The insert can include a wire channel for retaining at least a portion of one or more wires within the trunk section such that the one or more wires are disposed at a predetermined location within the trunk section.

The foregoing summarizes only a few aspects of the present disclosure and is not intended to be reflective of the full scope of the present disclosure. Additional features and advantages of the present disclosure are set forth in the following detailed description and drawings, may be apparent from the detailed description and drawings, or may be learned by practicing the present disclosure. Moreover, both the foregoing summary and following detailed description are exemplary and explanatory and are intended to provide further explanation of the presently disclosed technology as claimed.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
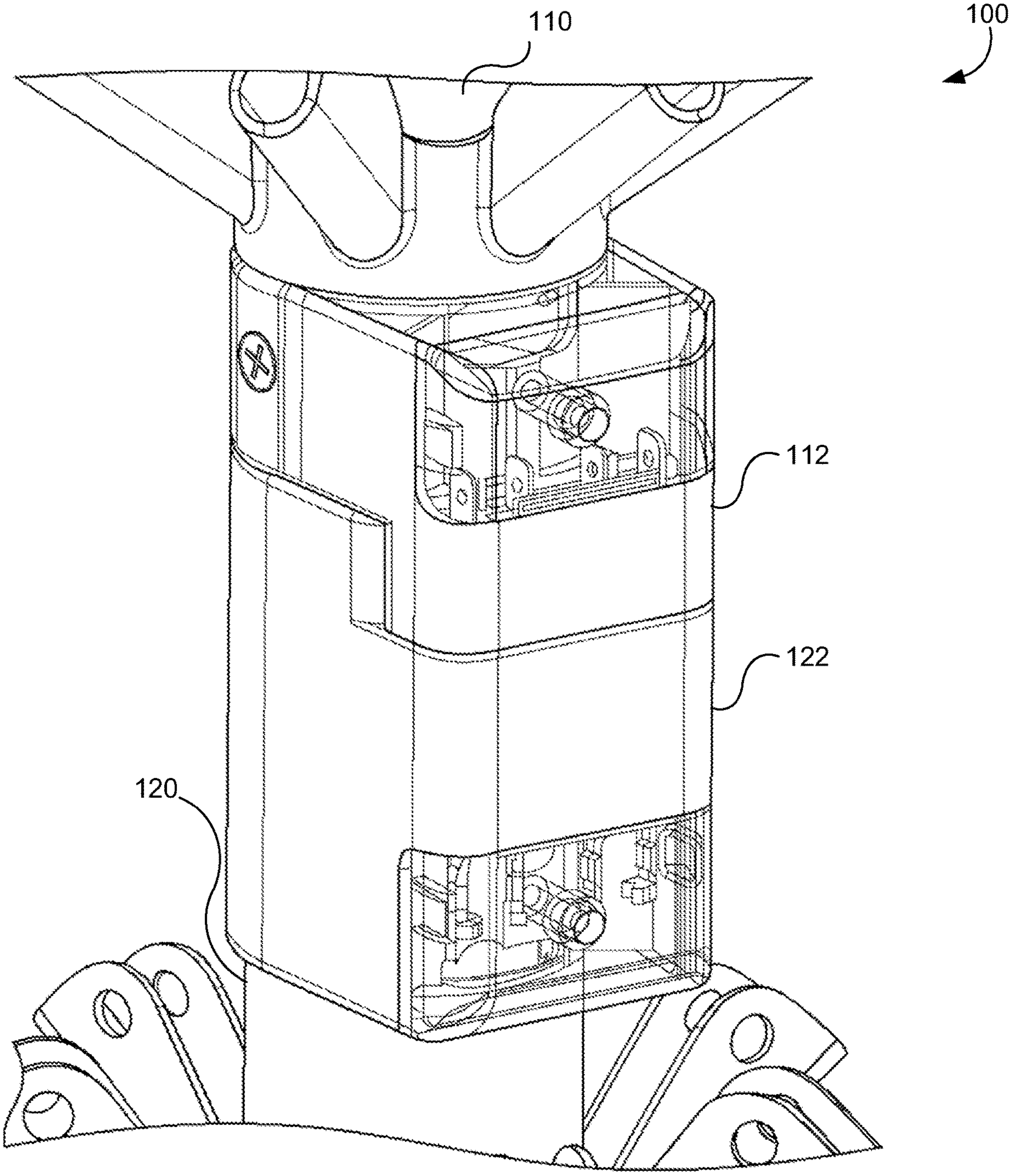
FIG. 1 depicts a perspective view of assembled trunk sections having power distribution subsystems, in accordance with some embodiments of the present disclosure.

Embodiments of the present disclosure relate to artificial trees, such as artificial Christmas trees. Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

To facilitate an understanding of the principles and features of the disclosed technology, various illustrative embodiments are explained below. In particular, the presently disclosed technology is described in the context of being an artificial tree power system. Some embodiments of the disclosed technology are disclosed in the context of being mechanical connectors and/or electrical connectors for use in an artificial tree power system. The present disclosure, however, is not so limited, and can be applicable in other contexts. For example and not limitation, the present disclosure may improve other power systems, such as light poles, lamps, extension cord systems, power cord connection systems, and the like. These embodiments are contemplated within the scope of the present disclosure. Accordingly, when the present disclosure is described in the context of a power transfer system for an artificial Christmas tree, it will be understood that other embodiments can take the place of those referred to.

When assembling an artificial tree, decorators commonly desire to illuminate the tree with one or more light strings, i.e., strands of lights. The light strings require electrical power and are conventionally connected in series. In many designs, at least one of the light strings is connected to a wall outlet to provide power to all of the light strings. When decorating a tree, the decorator can walk around the tree, placing the light strings on various locations on the branches of the tree. In order to provide power to all of the light strings, typical light strings come with a first end in the form of a male end and a second end in the form of a female end.

To provide power to more than one light string, the decorator can insert the male end of one light string into the female end of another light string. In doing so, the light string that is electrically connected to a wall outlet (or other power source) transfers electrical energy from the source to subsequent light strings. In some conventional systems, the lights strings can have multiple points of electrical connectivity, providing for parallel or serial connectivity. Even so, the flow of power is usually from one light string connected to the power source to one or more downstream light strings.

The act of providing power from the power source to one or more light strings can be cumbersome and frustrating for a decorator. In order to attach multiple light strings together, the decorator will either need to attach the light strings prior to their placement on the tree or attach the light strings after they have been placed on the tree. If the decorator attaches multiple light strings together, in order to “wrap” the tree with the light strings, the decorator often must walk around the tree, carrying the multiple strings. If the decorator waits until after the light strings are placed on the tree, the decorator will need to reach through the tree branches and electrically connect the light strings. The decorator would also likely need to manipulate the light strings in order to connect the strings together. This process can be difficult and can take an extended amount of time.

To alleviate issues associated with providing power to light strings in conventional artificial trees, and to provide further advantages, the present disclosure comprises a power transfer system for an artificial tree. The present disclosure comprises an artificial trunk comprising trunk sections that are engaged with one another to form the trunk of an artificial tree. At least some of the trunk sections may be hollow, and power distribution subsystems may be partially disposed within one or more trunk sections. Power distribution subsystems can comprise a female end or a male end located proximate either end of the trunk sections. One or more trunks sections can comprise both a female end and a male end. When one trunk section is engaged with another trunk section, the male end of one power distribution subsystem engages with and is electrically and mechanically connected to the female end of a neighboring power distribution subsystem. The engaged male and female ends may be joined via a coupling, and the coupling may house at least a portion of the power distribution subsystems externally to the trunk sections, which may provide easier access to or make it easier to replace wiring and other components of the power distribution subsystems without distracting from the aesthetics of the artificial tree. One or more of the power subsystems may be in electrical communication with an external power source (e.g., a wall outlet) and configured to provide electricity to joined power distribution subsystems. Thus, by electrically connecting a power distribution subsystem of a trunk section to an external power source, electrical power flows from the source to that trunk section, and from that trunk section through the coupling and on to other trunk sections.

A variety of systems exist to facilitate joining the male and female ends of power distribution subsystems. Although conventional plug and outlet systems can be used, such as those manufactured in accordance with NEMA standards, in some cases, it can be difficult in conventional designs to align the male prongs of one trunk section with the female holes of another trunk section. In order to engage the male end with the female end, the assembler of the tree is generally required to vertically align the trunk sections while additionally rotationally aligning the two trunk sections to allow the male prongs to line up with the female holes. Even if the trunk sections are perfectly vertical, in conventional systems, the male prongs can only engage the female holes if the male prongs are rotationally aligned with the female holes. If the male prongs are not rotationally aligned with the female holes, the male prongs may abut the area around the female holes rather than being inserted into the female holes, and an electrical connection will not be made. Attempting to align the male prongs and the female holes can therefore take significant time and can be a frustrating experience for a user. Further difficulty and frustration can be caused if the male prongs become bent such that one or more of the male prongs do not properly align with the corresponding female hole.

Some existing systems can include male and female connectors configured to connect at a plurality of rotational alignments. For example, some existing systems can include male and female coaxial electrical connectors. As explained above, however, such designs can permit a first trunk section to freely rotate in relation to an adjacent second trunk section while the first and section trunk sections are electrically connected. In some such designs the first trunk section can freely rotate in a full rotation with respect to the second trunk section, and in some designs, the first trunk section can freely rotate in a partial rotation (i.e., less than 360°) with respect to the second trunk section. Regardless, any free rotation of the first trunk section with respect to the first trunk section can permit the first trunk section to become misaligned with the second trunk section such that ornaments or other decorations positioned on the first and second trunk sections can become located in an undesirable position or arrangement. This may undesirably alter a decorative presentation that had been arranged by a tree assembler and/or decorator.

Further, existing systems including male and female connectors configured to freely rotate while connected generally require the extending portion of the first trunk section to have an outer diameter that is smaller than the inner diameter of the receiving portion of the second trunk section, but not so small that the first tree section can wobble or shift with respect to the second trunk section. This may require a high degree of precision to consistently manufacture trunk sections having protruding portions and receiving portions that maintain an appropriate difference in diameter to simultaneously permit easy assembly and prevent wobbling or shifting of the trunk sections when assembled.

To alleviate these and other problems, the disclosed technology comprises a male end of a first trunk section having a first electrical connector positioned external to the first trunk section and a first mechanical coupler including an extending portion, angled guiding surfaces, and a substantially vertical (i.e., axially extending) guiding slot. The disclosed technology also comprises a female end of a second trunk section having a second electrical connector positioned external to the corresponding trunk section and a second mechanical coupler including a receiving portion and a guiding protrusion that is at least partially disposed within the second trunk section. As will be discussed more fully below, the receiving portion of the female end can be configured to receive the extending portion of the male end such that, if the guiding protrusion of the female end is aligned with the guiding slot of the male end as the extending portion is inserted into the receiving portion, the guiding protrusion can traverse the guiding slot until the extending portion is fully inserted into the receiving portion, mechanically coupling the first trunk section to the second trunk section, and the first and second electrical connectors are in electrical communication. If the guiding protrusion is not aligned with the guiding slot, the guiding protrusion can contact at least one guiding surface of the male end as the extending portion is inserted into the receiving portion, and as gravity or another force further directs the extending portion into the receiving portion, the angled nature of the guiding surface guides or directs the guiding protrusion to the guiding slot, causing the first trunk section to rotate relative the second trunk section and ultimately resulting the first electrical connector becoming vertically aligned with the second electrical connector. Once the guiding protrusion is aligned with the guiding slot (and the first electrical connector is aligned with the second electrical connector), the guiding protrusion can traverse the guiding slot until the extending portion is fully inserted into the receiving portion, mechanically coupling the first trunk section to the second trunk section, and the first and second electrical connectors are in electrical communication. in the first and second electrical connectors to become aligned and electrically connected as the mechanical couples detachably attach the first and second trunk sections together.

Embodiments of the present disclosure can also be used in a variety of systems. For example, the present disclosure can be used in low voltage systems (e.g., 5V systems for powering LEDs or small electronics) and/or can be used in high voltage systems (e.g., 120V or 240V systems that may originate from a wall outlet).

The present disclosure can be used with a variety of devices or systems, including a power distribution system (or subsystem) of an artificial tree. An artificial tree may include two, three, four, five, or six trunk sections (or more, depending on the desired tree height and the height of each trunk section). These trunk sections may be vertically stacked or otherwise attached on top of one another to form the trunk. A plurality of branches may be attachable to the trunk (or already attached, and foldable) to follow the appearance and structure of a natural tree. The artificial tree may be pre-lit, such that a power cord extending from the tree can be plugged into a wall outlet to power a string of lights that is pre-arranged around the branches of the artificial tree. Pre-lit artificial trees may be advantageous over other artificial trees because they expedite and simplify assembly and disassembly of the tree. The present disclosure can further expedite and simplify assembly of the pre-lit artificial tree by not requiring rotational alignment of the neighboring trunk sections upon initial attachment while guiding or directing the trunk sections into a single, predetermined alignment upon completion of mechanically coupling the neighboring trunk section.

Referring now to the figures, wherein like reference numerals represent like parts throughout the views, exemplary embodiments will be described in detail.

FIG. 1 depicts an example portion of an assembled trunk 100. The trunk 100 may include a plurality of trunk sections (e.g., a first trunk section 110 and a second trunk section 120). As shown, a male end of the first trunk section 110 may be detachably attachable to a female end of the second trunk section 120. As will be described more fully, the male end can include a first external electrical connector 112, and the female end can include a second external electrical connector 122. When the first trunk section 110 and second trunk section 120 are attached, the first electrical connector 112 can be in electrical communication with the second electrical connector 122.

Referring to FIGS. 2A-2F, the first trunk section 110 can include an extending portion 202 and a first mechanical coupler 204. The first mechanical coupler 204 can be separate and distinct from the first electrical connector 112. The first mechanical coupler 204 can include an insert that is insertable into and attachable to the male end of the first trunk section 110. The first mechanical coupler 204 can be retained by the first trunk section 110 by frictional forces between the inner wall of the first trunk section 110 and an outer wall of the first mechanical coupler 204. Alternately or in addition, the inner wall of the first mechanical coupler 204 and the inner wall of the first trunk section 110 can be threaded such that the mechanical coupler 204 can be screwed into the first trunk section 110, or the first mechanical coupler 204 can be attached to the first trunk section 110 by crimping, welding, or soldering or with an adhesive (e.g., glue, epoxy), a screw, a bolt, one or more rivets, a retaining clip, a detent and notch assembly (e.g., a protrusion extending from either the first mechanical coupler 204 or the first trunk section 110 and the remaining object including a notch, a hole, a depression, a lip, or any other feature configured to retain the protrusion, such as the detent 201 shown in FIG. 2C), or any other known attachment mechanisms or methods.

Figure 2B:
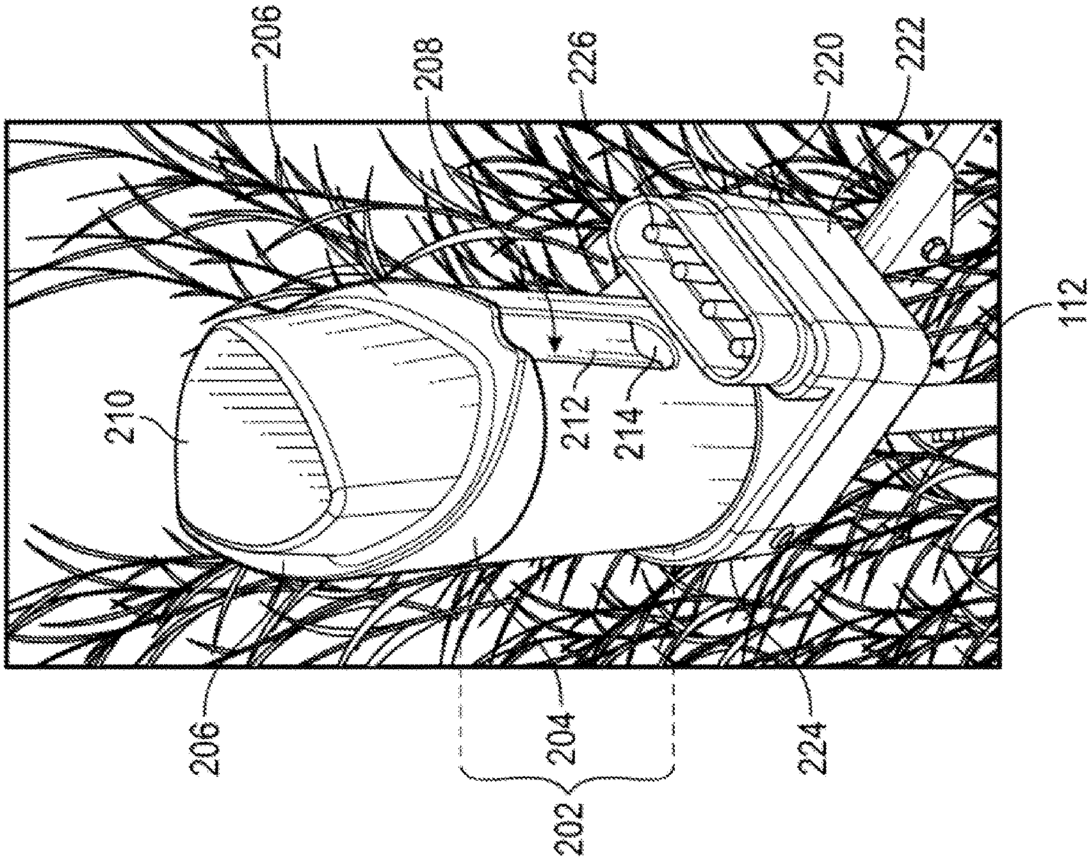
FIG. 2B depicts a perspective bottom view of a male end of a trunk section, in accordance with some embodiments of the present disclosure.
Figure 2A:
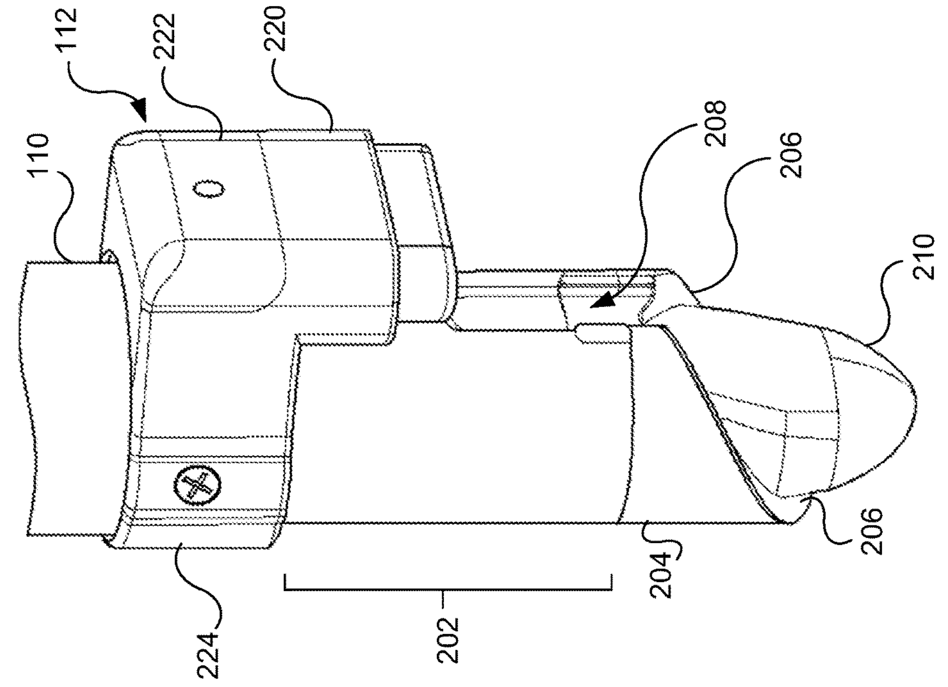
FIG. 2A depicts a perspective view of a male end of a trunk section, in accordance with some embodiments of the present disclosure.
Figure 2D:
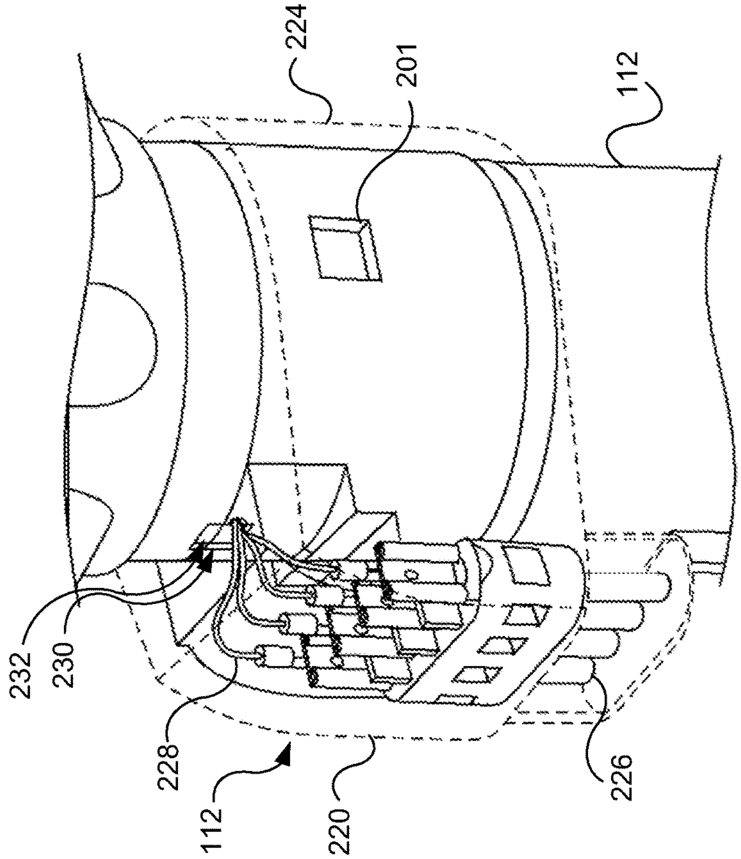
FIG. 2D depicts a magnified perspective view of a male external electrical connector installed on a male end of a trunk section, particularly of area A indicated in FIG. 2C, in accordance with some embodiments of the present disclosure.
Figure 2C:
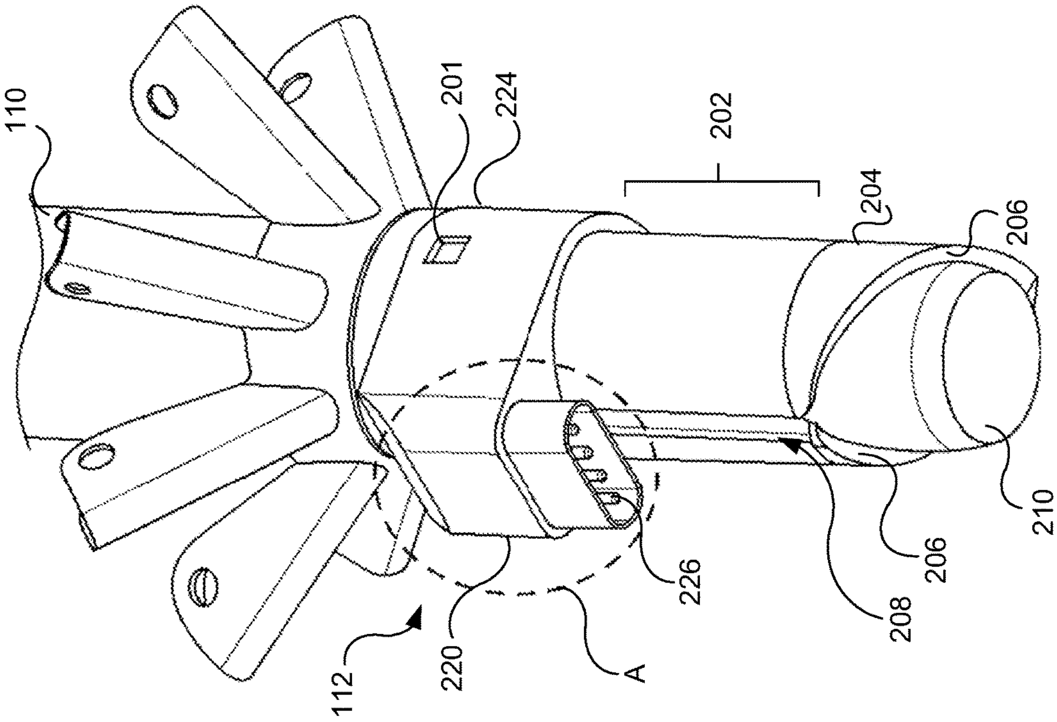
FIG. 2C depicts a perspective bottom view of a male end of a trunk section, in accordance with some embodiments of the present disclosure.
Figure 2E:
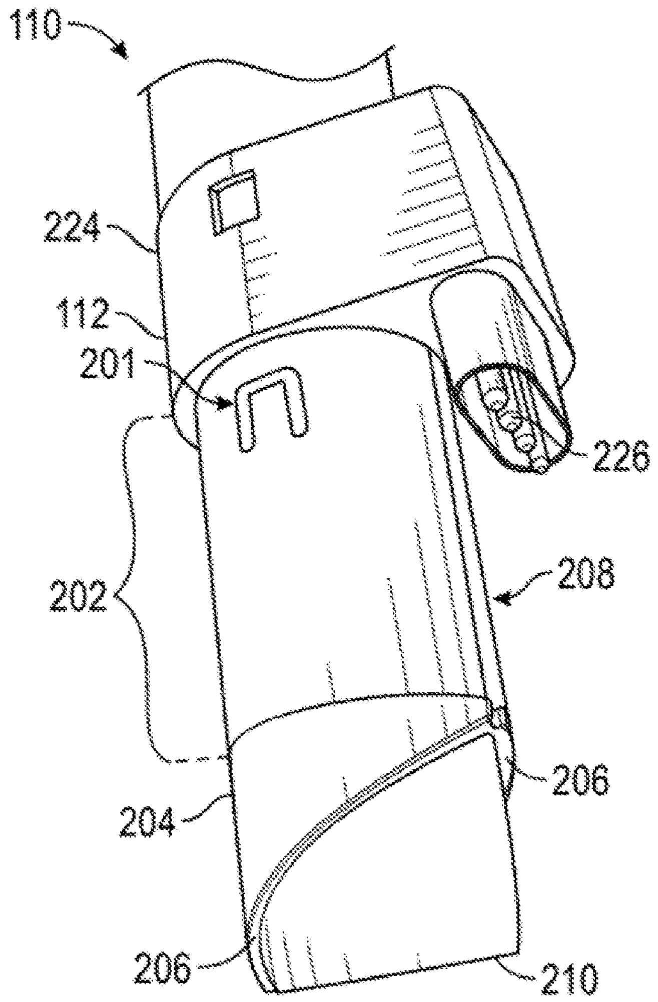
FIG. 2E depicts a perspective bottom view of a male end of a trunk section, in accordance with some embodiments of the present disclosure.
Figure 2F:
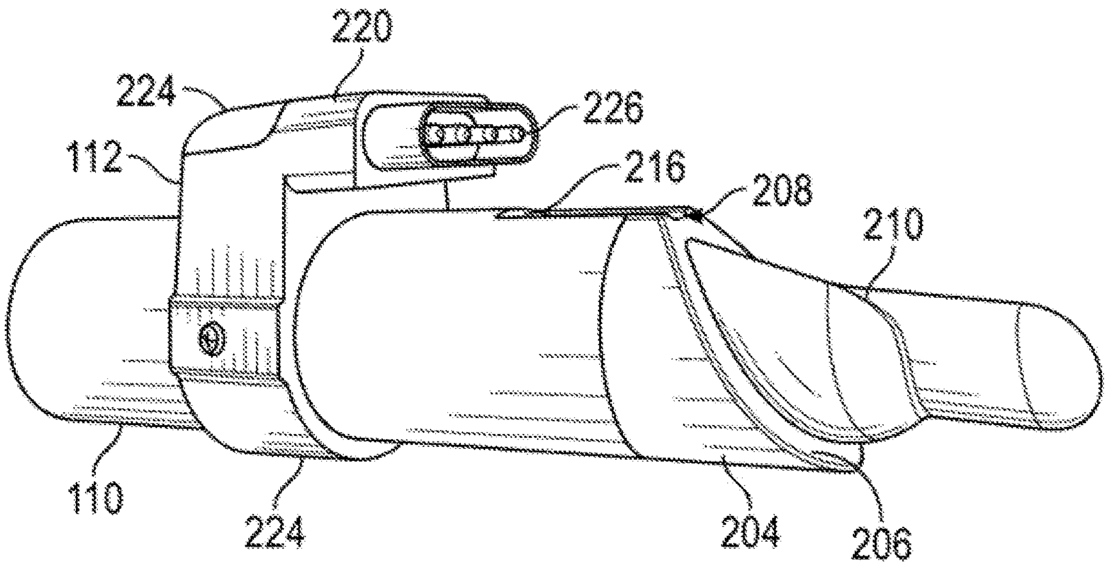
FIG. 2F depicts a perspective side-bottom view of a male end of a trunk section, in accordance with some embodiments of the present disclosure.

The first mechanical coupler 204 can include one or more guiding surfaces 206. The guiding surfaces 206 can be disposed circumferentially on the first mechanical coupler 204 and can angled from a rearmost and lowermost point to a foremost and uppermost point, and an axially extending guiding slot can be positioned at the foremost and uppermost point. The guiding slot 208 can include a slot disposed in the first mechanical coupler 204, as well as a slot cut into, or otherwise formed in, the extending portion 202 of the first trunk section 110. Stated otherwise, the slot of the first trunk section 110 and the slot of the first mechanical coupler 204 can align and combine to form the guiding slot 208. The guiding slot 208 can include an axial channel or depression 212 in the first mechanical coupler 204 and an axially extending cutout 214 in the wall of the first trunk section 110. The cutout 214 of the first trunk section 110 can have a substantially similar width to that of the channel 212 of the first mechanical coupler 204. The channel 212 can extend the entire length of the cutout 214 or can extend only a portion of the cutout 214. As shown in FIG. 2F, the channel 212 can terminate at an end wall 216. Thus, if the first mechanical coupler 204 includes an end wall 216, the end wall 216 can abut the top surface of the guiding protrusion of the second mechanical coupler 304 when the first and second trunk section 110, 120 are mechanically coupled. If the first mechanical coupler 204 does not include an end wall 216, the apical portion of the cutout (or terminal end of the cutout) 214 can abut the top surface of the guiding protrusion of the second mechanical coupler 304 (shown in FIGS. 3A-3H) when the first and second trunk section 110, 120 are mechanically coupled. The cutout 214 and/or the channel 212 may have a length such that the top surface of the guiding protrusion of the second mechanical coupler 304 when the first and second trunk section 110, 120 are mechanically coupled (i.e., when the first and second trunk section 110, 120 are mechanically coupled, a space or void may exist between the top surface of the guiding protrusion and the end wall 216 and/or the apical portion of the cutout 214). The end wall 216 may include a lip that is configured to abut and/or cover the apical portion of the cutout 214.

The first mechanical coupler 204 can include a tip 210 to facilitate easy insertion of the extending portion 202 into the second trunk section 120. The tip 210 can be rounded, as shown in FIG. 2A, can have a three-dimensional polygonal shape, as shown in FIG. 2B, or can have a cylindrical shape, as shown in FIGS. 2C and 2E. The tip 210 may have a cross-section having a shape that is a circle, oval, triangle, square, rectangle, pentagon, hexagon, heptagon, octagon, any other polygon, or any other shape. The tip 210 may include an extending portion, such as shown in FIG. 2F, and as discussed more fully below, the extending portion of the tip 210 may be configured to couple or mate with an internal insert of the second mechanical coupler 304.

As mentioned above, the first trunk section 110 can include the first external electrical connector 112 (referred to herein as the first electrical connector 112). The first electrical connector 112 can include a housing 220, which can include an aperture covered by a cover 222. The first electrical connector 112 can include a collar 224, and the collar 224 can be attached or affixed to the outer surface of the first trunk section 110. For example, the collar 224 can be attached to the first trunk section 110 by crimping, welding, or soldering or with an adhesive (e.g., glue, epoxy), a screw, a bolt, one or more rivets, a retaining clip, a detent and notch assembly, or any other known attachment mechanisms or methods. The housing 220 can include electrical contacts, such as electrical pins 226. The first electrical connector 112 can include two, three, four, or more electrical pins 226. Each pin 226 can be in electrical communication with a wire 228 and the wires 228 can be routed through an inner portion of the first trunk section 110 or can be routed externally alongside the first trunk section 110. If the wires 228 are routed internally through the first trunk section 110, the wires 228 can extend into the internal portion of the first trunk section 110 through a rear aperture or hole 230 in the housing 220 and an aperture or hole 232 in the wall of the first trunk section 110.

Figure 3B:
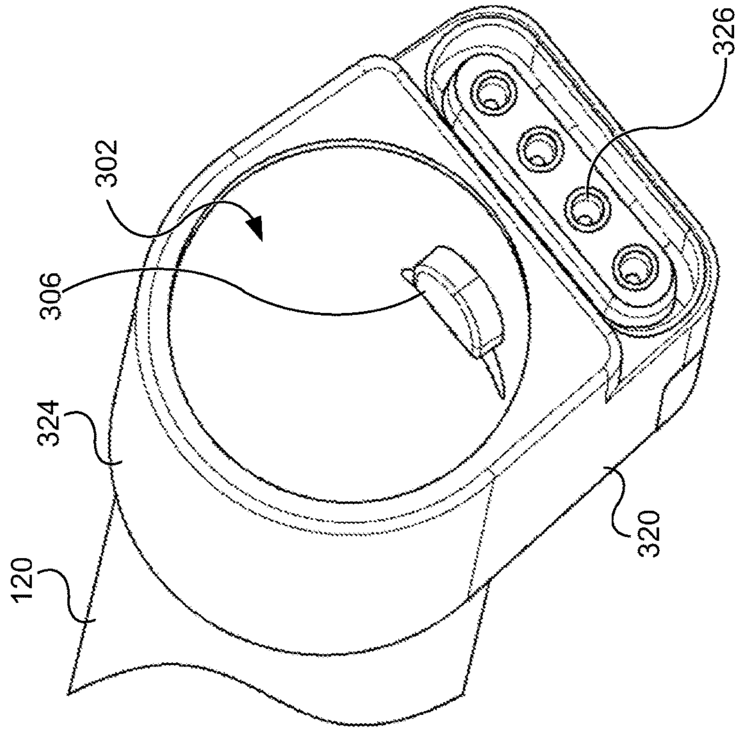
FIG. 3B depicts a perspective bottom view of a female end of a trunk section, in accordance with some embodiments of the present disclosure.
Figure 3A:
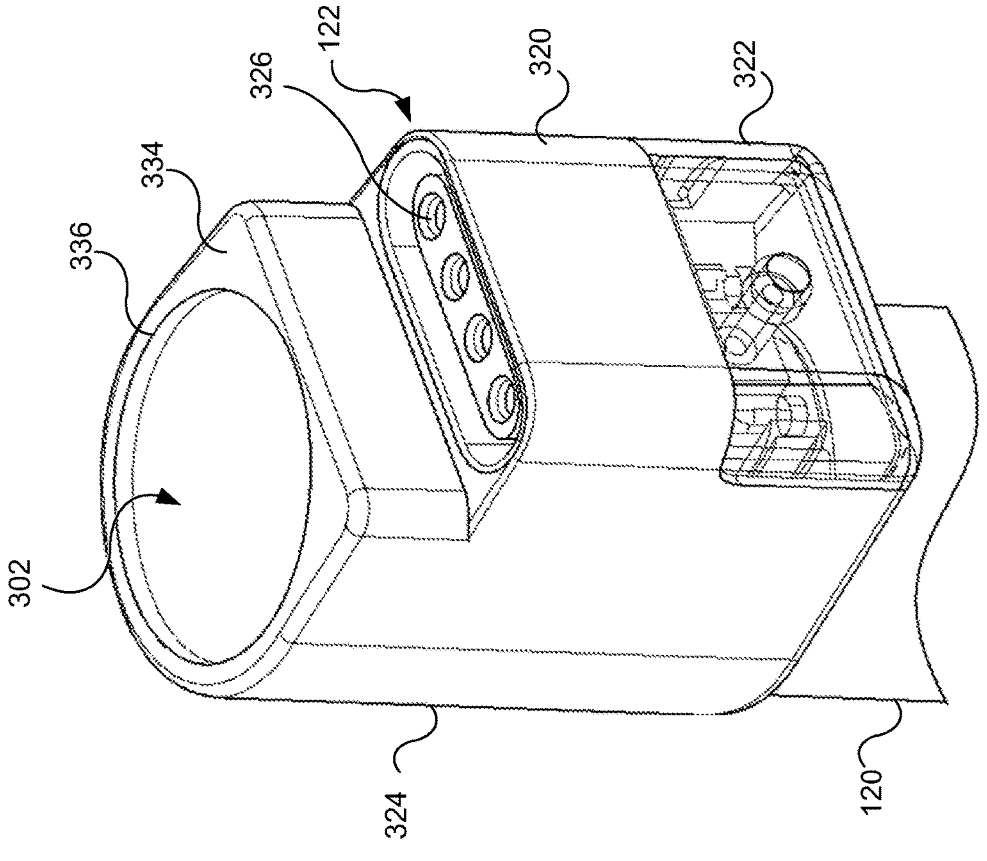
FIG. 3A depicts a perspective view of a female end of a trunk section, in accordance with some embodiments of the present disclosure.
Figure 3D:
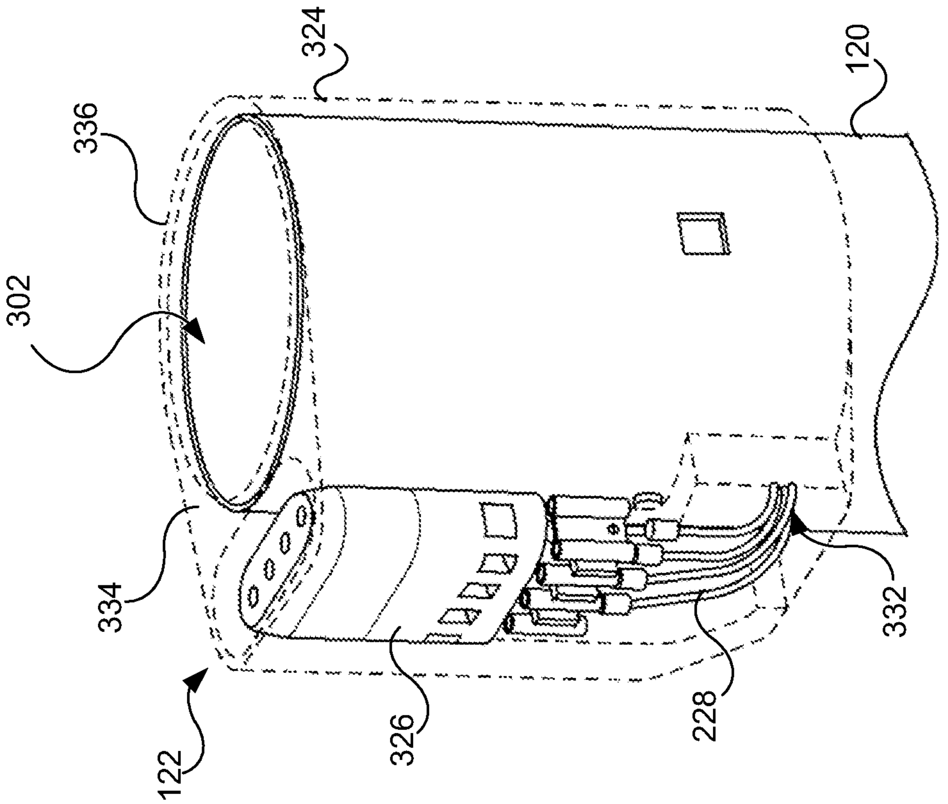
FIG. 3D depicts a perspective view of a female end of a trunk section with portions of the female end transparent for clarity, in accordance with some embodiments of the present disclosure.
Figure 3C:
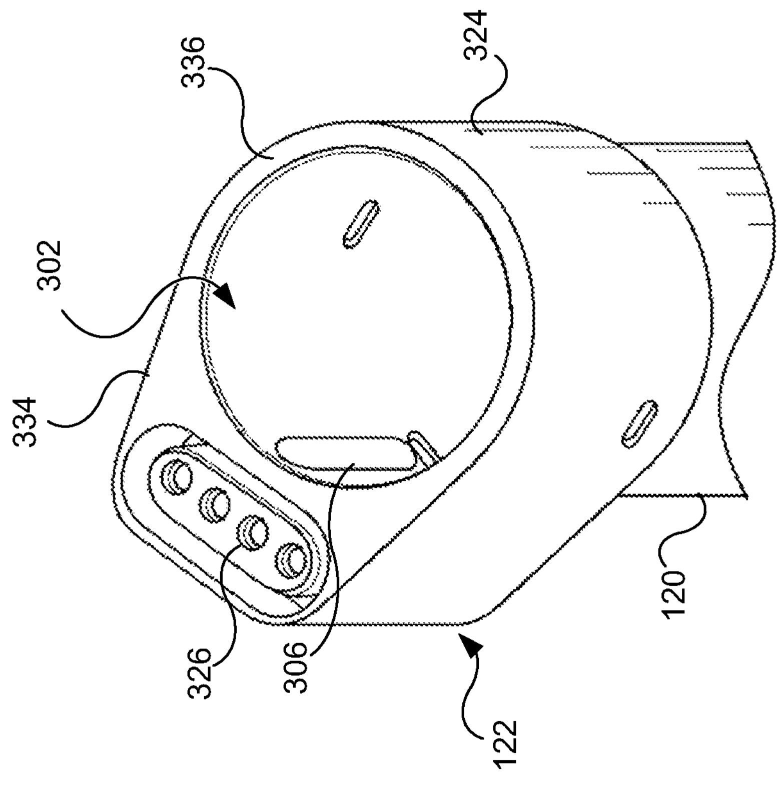
FIG. 3C depicts a perspective top view of a female end of a trunk section, in accordance with some embodiments of the present disclosure.
Figure 3F:
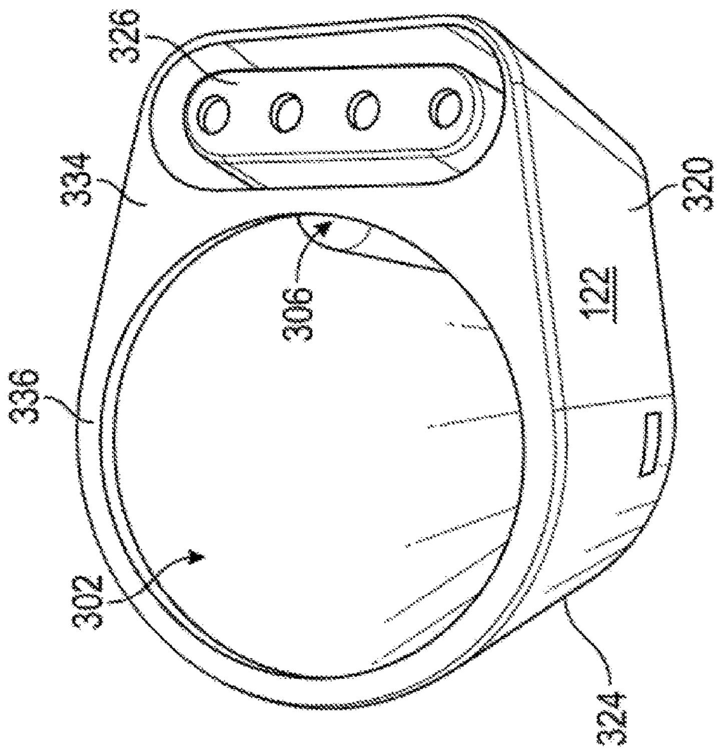
FIG. 3F depicts a perspective top view of a female end of a trunk section, in accordance with some embodiments of the present disclosure.
Figure 3E:
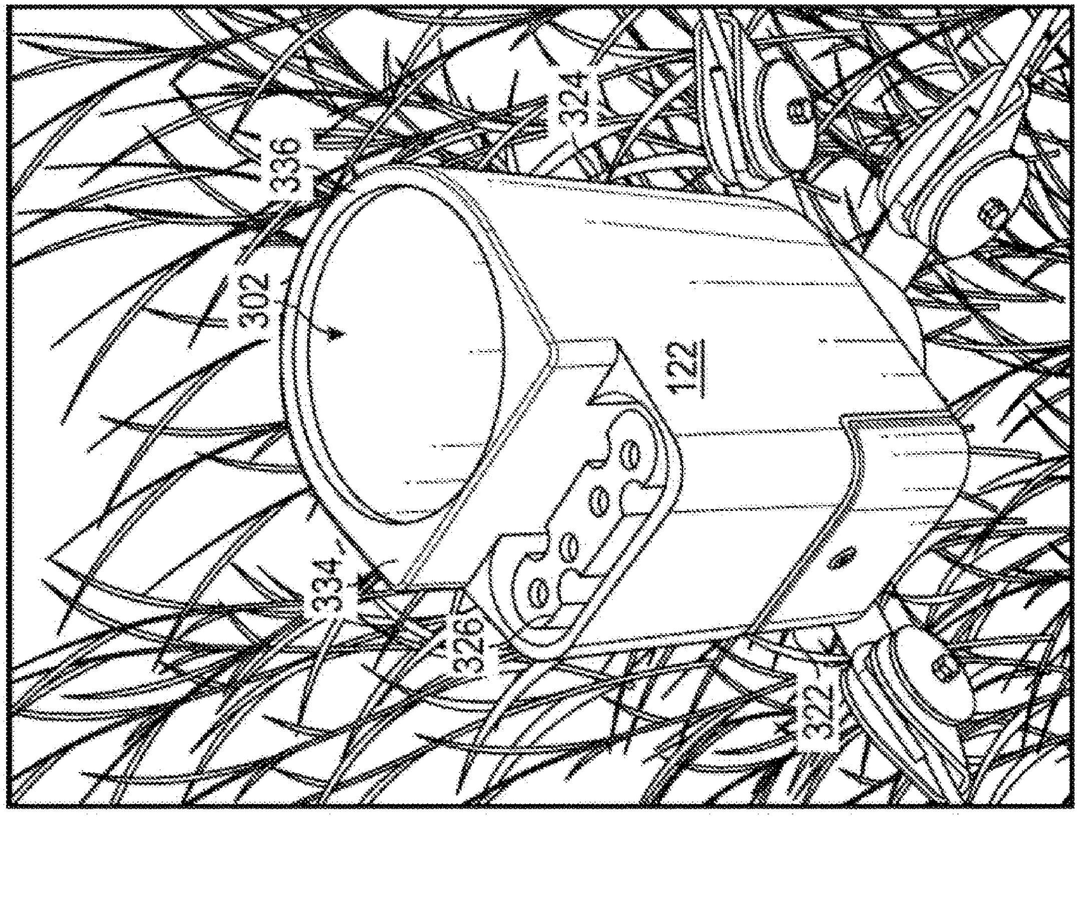
FIG. 3E depicts a perspective top view of a female end of a trunk section, in accordance with some embodiments of the present disclosure.
Figure 3G:
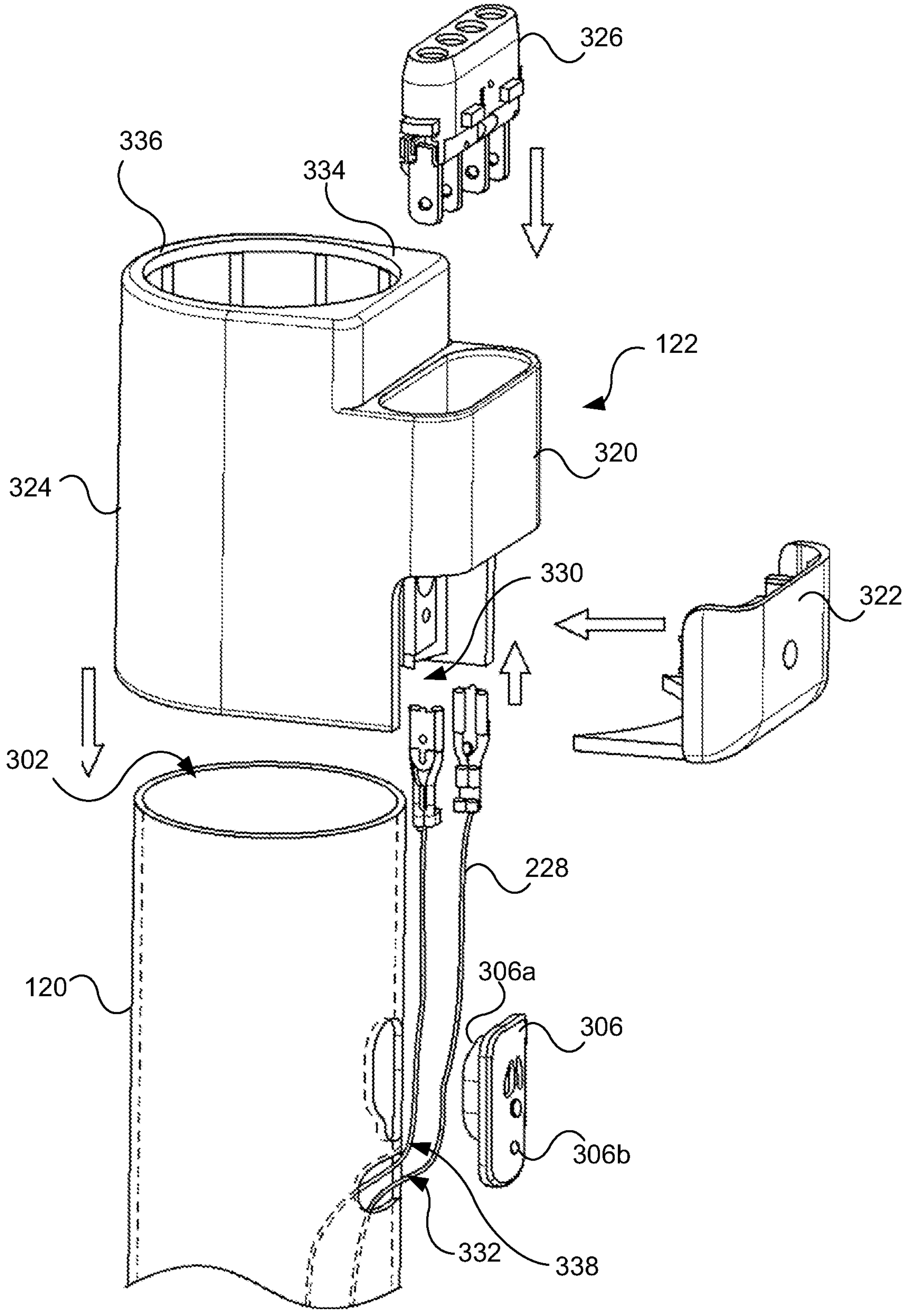
FIG. 3G depicts an exploded view of a female end of a trunk section, in accordance with some embodiments of the present disclosure.
Figure 3H:
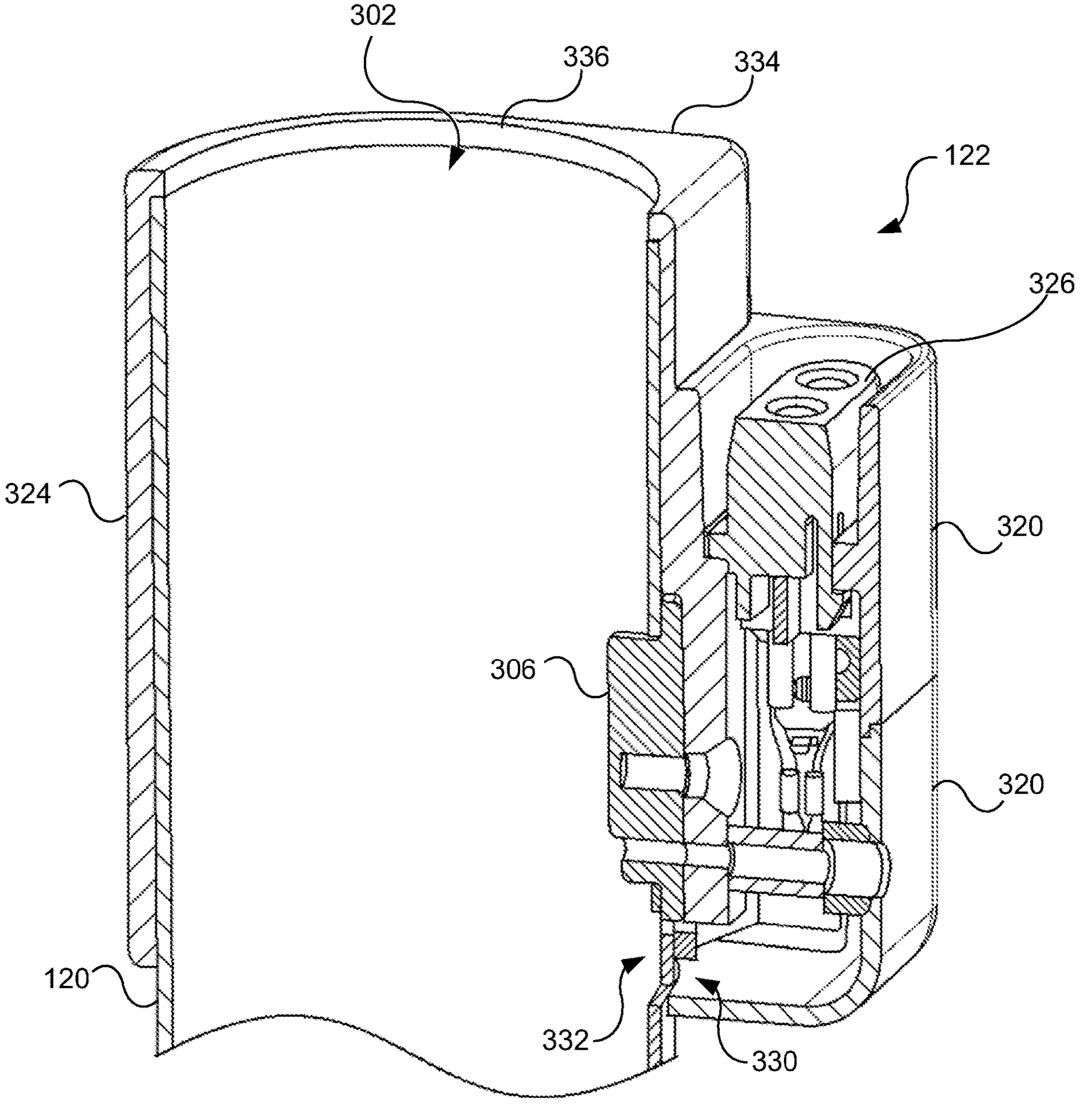
FIG. 3H depicts a cross-sectional view of a female end of a trunk section, in accordance with some embodiments of the present disclosure.
Figure 4A:
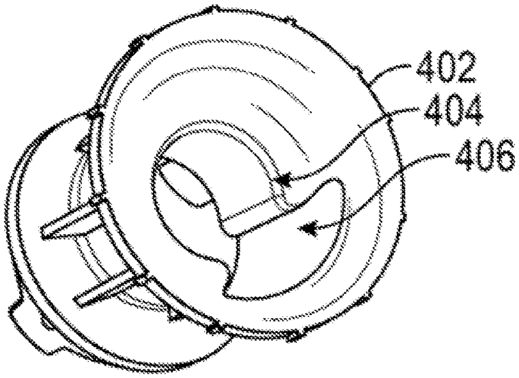
FIG. 4A depicts a perspective view of an insert for a mechanical coupler of a female end of a trunk section, in accordance with some embodiments of the present disclosure.
Figure 4B:
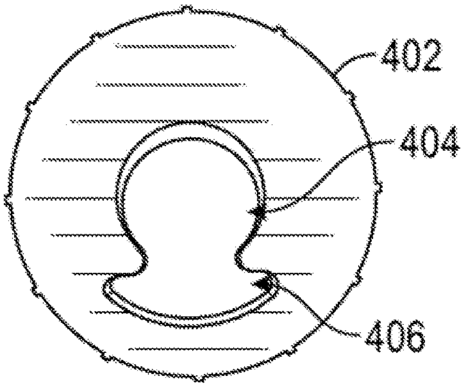
FIG. 4B depicts a top view of an insert for a mechanical coupler of a female end of a trunk section, in accordance with some embodiments of the present disclosure.
Figure 4C:
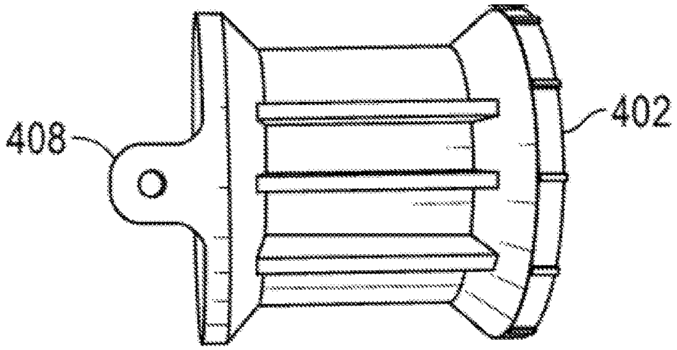
FIG. 4C depicts a side view of an insert for a mechanical coupler of a female end of a trunk section, in accordance with some embodiments of the present disclosure.
Figure 4D:
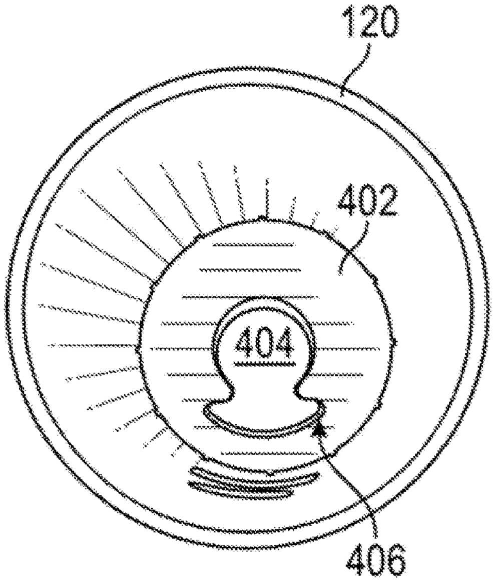
FIG. 4D depicts a top view of an insert for a mechanical coupler of a female end of a trunk section inserted in a female end of a trunk section, in accordance with some embodiments of the present disclosure.
Figure 4E:
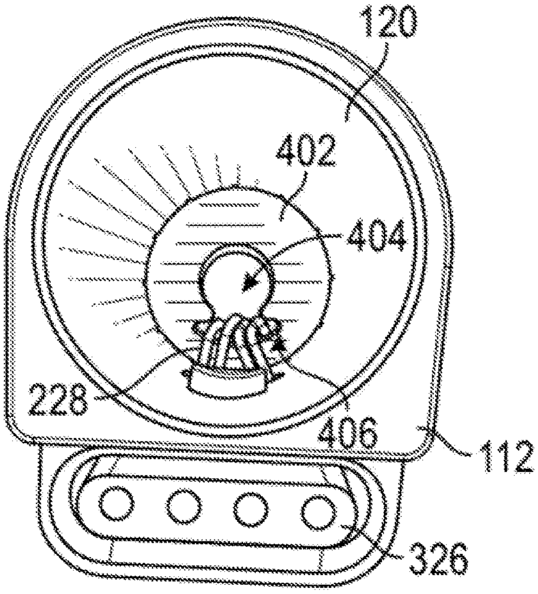
FIG. 4E depicts a top view of an insert for a mechanical coupler of a female end of a trunk section inserted in a female end of a trunk section, in accordance with some embodiments of the present disclosure.

Referring to FIGS. 3A-3H, the second trunk section 120 can include a receiving portion 302 and a second mechanical coupler 304 including a guiding protrusion 306. The receiving portion 302 can comprise a hollow portion of the second trunk section 120. The guiding protrusion 306, which is shown most clearly in FIGS. 3B, 3C, 3F, and 3H, can include an insert extending through a hole or aperture in the wall of the second trunk section 120. Alternately, the guiding protrusion 306 can include an insert attached or affixed to the inner wall of the second trunk section 120, a screw or bolt extending through the wall of the second trunk section 120, a crimped or stamped portion of the wall of the second trunk section 120 (e.g., as shown in FIG. 3C), or any other feature extending into the receiving portion 302 and sized to freely traverse the guiding slot 208 of the first mechanical coupler 204. As discussed more fully below and as shown in FIG. 3G, the guiding protrusion 306 can have a protruding portion 306*a* and a base portion 306*b*. The protruding portion 306*a* can be inserted into an aperture or hole (e.g., hole 338 discussed more fully below) in the wall of the second trunk section 120 such that the base portion is positioned outside the second trunk section 120, and the second electrical connector 122 can be attached or affixed to the second trunk section 120 such that the base portion 306*b* of the guiding protrusion 306 is sandwiched between the second electrical connector 122 and the wall of the second trunk section 120. As shown most clearly in FIG. 3B, the guiding protrusion 306 can have a rounded (or alternately angled) topmost surface, which may facilitate easy sliding and traversal of the guiding protrusion along the guiding surfaces 206 and guiding slot 208 of the first mechanical coupler 204. The guiding protrusion 306 can be positioned within the second trunk section 120 at any circumferential position, provided the guiding slot 208 and guiding surfaces 206 are similarly positioned such that the electrical contacts of the first and second trunk sections 110, 120 are aligned when the first and second trunk sections 110, 120 become mechanically coupled. The guiding protrusion 306 can be attached or affixed The second trunk section 120 can include a second external electrical connector 122 (referred to herein as the second electrical connector 122) that can include a housing 320, which can include an aperture covered by a cover 322. The second electrical connector 122 can include a collar 324, and the collar 324 can be attached or affixed to the outer surface of the first trunk section 120. For example, the collar 324 can be attached to the first trunk section 120 by crimping, welding, or soldering or with an adhesive (e.g., glue, epoxy), a screw, a bolt, one or more rivets, a retaining clip, a detent and notch assembly, or any other known attachment mechanisms or methods. The housing 320 can include electrical contacts that are equal to the number of electrical pins 226. For example, the second electrical connector 122 can include two (as shown in FIG. 3G), three, four (as shown in FIG. 3A-3F), or more electrical contacts. The electrical contracts can include or be in electrical communication with a socket connector 326, and the socket connector 326 can include a socket corresponding to each pin 226. Each socket can be in electrical communication with a wire 228, and the wires 228 can be routed through an inner portion of the second trunk section 110, such as shown in FIG. 3G. Alternately, the wires 228 can be routed externally alongside the second trunk section 120. If the wires 228 are routed internally through the first trunk section 110, the wires 228 can extend into the internal portion of the second trunk section 120 through a rear aperture or hole 330 in the housing 220 and an aperture or hole 332 in the wall of the second trunk section 120. Although not depicted, the wires connected to the first electrical connector 112 can be similarly routed into the internal portion of the first trunk section 110. As shown in FIG. 3G, the wires 228 can be connected to the socket connector 326 using quick-connect and/or quick-disconnect electrical connectors.

The second electrical connector 122 can include a top surface 334 configured to abut a bottom surface of the first electrical connector's 112 collar 224 when the first trunk section 110 and the second trunk section 120 are connected. The top surface 334 can extend to, and be flush with, an end of the second trunk section. Alternately, the top surface 334 can extend beyond the end of the second trunk section 120, or the end of the second trunk section 120 can extend beyond the top surface 334. Alternately, the second electrical connector 122 can include a lip 336 such that the top surface 334 extends beyond the end of the trunk section 120 and the lip 336 covers the end of the second trunk section 120, as shown most clearly in FIG. 3H. The lip 336 can define an aperture that is substantially equal in diameter to the inner diameter of the end of the second trunk section 120.

FIG. 3G depicts a method of attaching the guiding protrusion 306 and the second electrical connector 122 to the second trunk section 120. The socket connector 326 can be inserted into the housing 320 of the second electrical connector 122. The wires 228 can be routed through the hole 332 of the second trunk section 120 and can be connected to corresponding electrical contacts of the socket connector 326. As described above, the guiding protrusion 306 can include a protruding portion 306*a* and a base portion 306*b*. The second trunk section 120 can include a hole or aperture 338, and the hole 338 can have a shape that is substantially the same as a cross-section of the protruding portion 306*a* of the guiding protrusion 306. The guiding protrusion 306 can be inserted into the hole 338 such that the protruding portion 306*a* is extending through the wall of the second trunk section 120 and into the hollow portion of the second trunk section 120 (e.g., the receiving portion 302) and the base portion 306*b* is positioned on the outer side of the wall of the second trunk section 120. The second electrical connector 122 can be placed over the end of the second trunk section 120, and in so doing, the second electrical connector 122 (e.g., the housing 320, the collar 324) can retain the guiding protrusion 306 in the inserted configuration with respect to hole 338. As the second electrical connector 122 is installed on the second trunk section 120, the wires 228 can extend through the hole 330 of the second electrical connector 122, in addition to extending through the hole 332 of the second trunk section 120. As shown more clearly in FIG. 3H, the second electrical connector 122 can be screwed or otherwise adhered to the guiding protrusion 306, which can retain both the guiding protrusion 306 and the second electrical connector 122 in their respective positions. That is, the second electrical connector 122 can prevent the guiding protrusion 306 from shifting radially outward from the second trunk section 120 (i.e., falling out of the hole 338), and the protruding portion 306*a*, which abuts the edges of the hole 338, can prevent the second electrical connector 122 from shifting axially with respect to the second trunk section 120 (i.e., falling off the end of the second trunk section 120). Alternately or in addition, the second electrical connector 122 can be attached directly to the second trunk section 120 by crimping, welding, or soldering or with an adhesive (e.g., glue, epoxy), a screw, a bolt, one or more rivets, a retaining clip, a detent and notch assembly, or any other known attachment mechanisms or methods. The cover 322 can be affixed to the second electrical connector 122, the guiding protrusion 306, and/or the second trunk section 120 such that access to the wires 228 and/or the connections between the wires 228 and the socket connector 326 is (temporarily or permanently) restricted. The cover 322 can be attached (detachably or permanently) to the second electrical connector 122, the guiding protrusion 306, and/or the second trunk section 120 by crimping, welding, or soldering or with an adhesive (e.g., glue, epoxy), a screw, a bolt, one or more rivets, a retaining clip, a detent and notch assembly, or any other known attachment mechanisms or methods. For example, the cover 322 can be screwed into the guiding protrusion 306. As will be appreciated, the above-described assembly of the first electrical connector 122 and/or the guiding protrusion 306 may be accomplished using fewer or additional steps and may be accomplished by completing various steps in a different order than expressly provided herein.

Figure 5A:
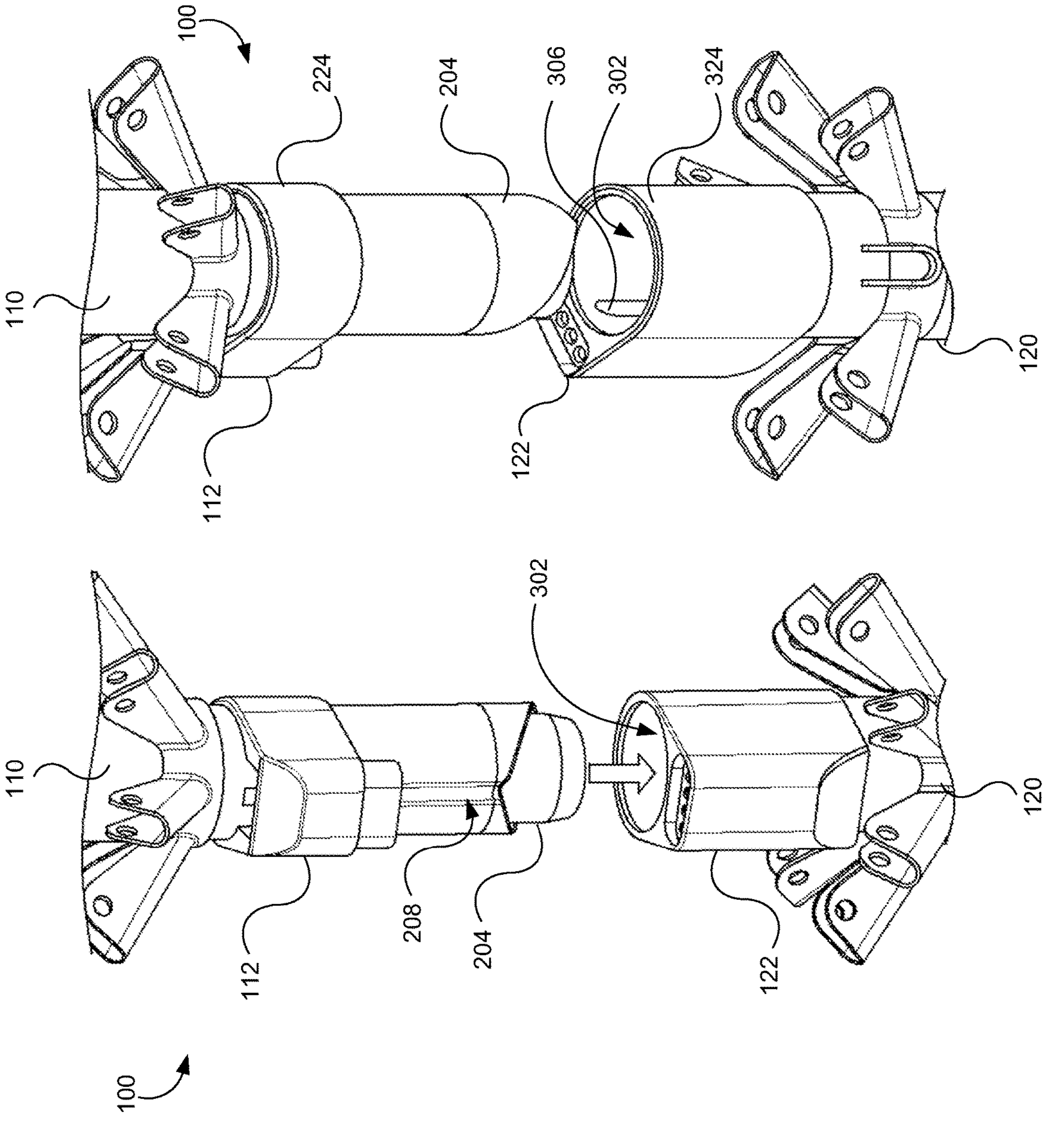
FIG. 5A depicts assembly of a male end of a trunk section and a female end of an adjacent trunk section, in accordance with some embodiments of the present disclosure.
Figure 5B:
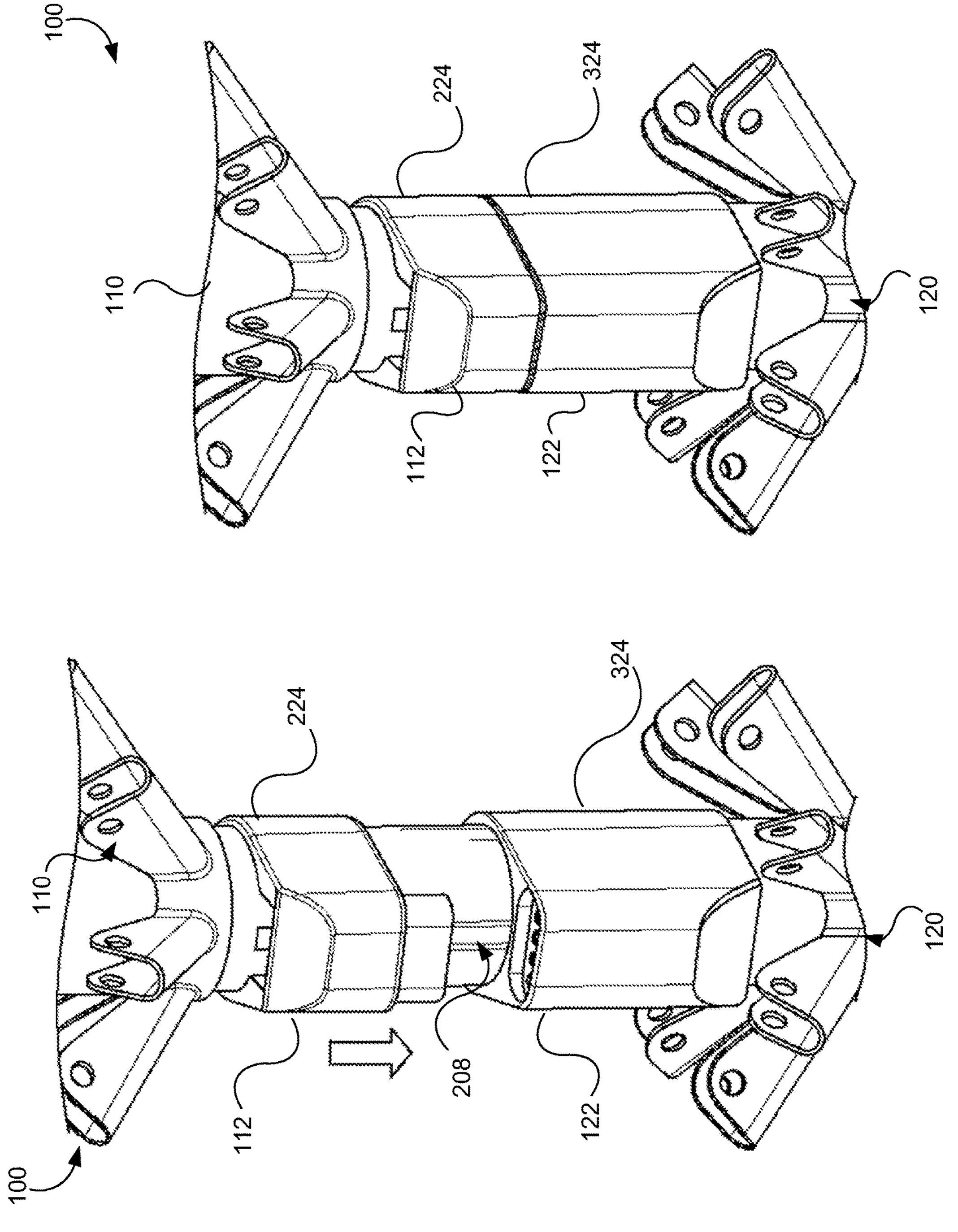
FIG. 5B depicts assembly of a male end of a trunk section and a female end of an adjacent trunk section, in accordance with some embodiments of the present disclosure.

The second mechanical coupler 304 can include an insert 402. The insert 402 may be configured to receive a portion of the first mechanical coupler 204 (e.g., the tip 210), which may provide increased stability when the first trunk section 110 and second trunk section 120 are mechanically coupled. For example, as shown in FIGS. 4A-4E, the insert 402 can include a receiving portion 404 that is configured to receive at least part of the tip 210 of the first mechanical coupler 204. As an example, the receiving portion 404 of the insert 402 may be configured to receive the extending portion of the tip 210 of the first mechanical coupler 204 depicted in FIG. 2F. The insert 402 can include a wire channel 406, which may be configured to at least partial contain or restrain the wires 228. The wire channel 406 may maintain the wires 228 in a position within the second trunk section 120 such that the tip 210 and the insert 402 can mechanically couple without interference from the wires 228. The insert 402 may include one or more attachment portions 408, which may be configured to receive a screw, a bolt, a rivet, or another attachment apparatus, such that the insert 402 can be attached to the wall of the second trunk section 120. Alternately or in addition, the insert may be attached to the second trunk section 120 by crimping, welding, or soldering or with an adhesive (e.g., glue, epoxy), a retaining clip, a detent and notch assembly, or any other known attachment mechanisms or methods An example method of assembling neighboring tree sections 110, 120 is depicted in FIGS. 5A and 5B. Referring to FIG. 5A, the receiving portion 302 of the second trunk section 120 can receive the extending portion 202 and the mechanical coupler 204 of the first trunk section 110. If, upon insertion of the first mechanical coupler 204 into the receiving portion 302, the guiding protrusion 306 of the second trunk section 120 is aligned with the guiding slot 208 of the first trunk section 110, the guiding protrusion 306 can traverse the guiding slot 208 until the extending portion 202 is fully inserted into the receiving portion 302, mechanically coupling the first trunk section 110 to the second trunk section 120. When the first and second trunk section 110, 120 are mechanically coupled, the respective electrical contact (e.g., the electrical pins 226 of the first trunk section 110 and electrical contacts included in the socket connector 326 of the second trunk section 120) can be in electrical communication.

If, upon insertion of the first mechanical coupler 204 into the receiving portion 302, the guiding protrusion 306 of the second trunk section 120 is not aligned with the guiding slot 208 of the first trunk section 110, the guiding protrusion 306 can contact a guiding surface 206 of the first mechanical coupler 204, and as gravity or another force further directs the extending portion 202 into the receiving portion 302, the angled nature of the guiding surface 206 can guide or direct the guiding protrusion 306 to the guiding slot 208, causing the first trunk section 110 to rotate relative the second trunk section 120 and ultimately resulting the first electrical connector 112 becoming vertically aligned with the second electrical connector 122. Once the guiding protrusion 306 becomes aligned with the guiding slot 208 (and the first electrical connector 112 becomes aligned with the second electrical connector 122), the guiding protrusion 306 can traverse the guiding slot 208 until the extending portion 202 is fully inserted into the receiving portion 302, mechanically coupling the first trunk section 112 to the second trunk section 122. When the first and second trunk section 110, 120 are mechanically coupled, the respective electrical contact (e.g., the electrical pins 226 of the first trunk section 110 and electrical contacts included in the socket connector 326 of the second trunk section 120) can be in electrical communication. When the extending portion 202 is fully inserted into the receiving portion 302, the bottom surface of the first electrical connector's 112 collar 224 may contact or abut the top surface 334 of the second electrical connector 122 and/or the end of the second trunk section 120. To decouple the first and second mechanical couplers 204, 302 and/or disconnect the first and second electrical connectors 112, 122, the first trunk section 110 can be lifted from the second trunk section 120 in an upward, axial direction.

Figure 6A:
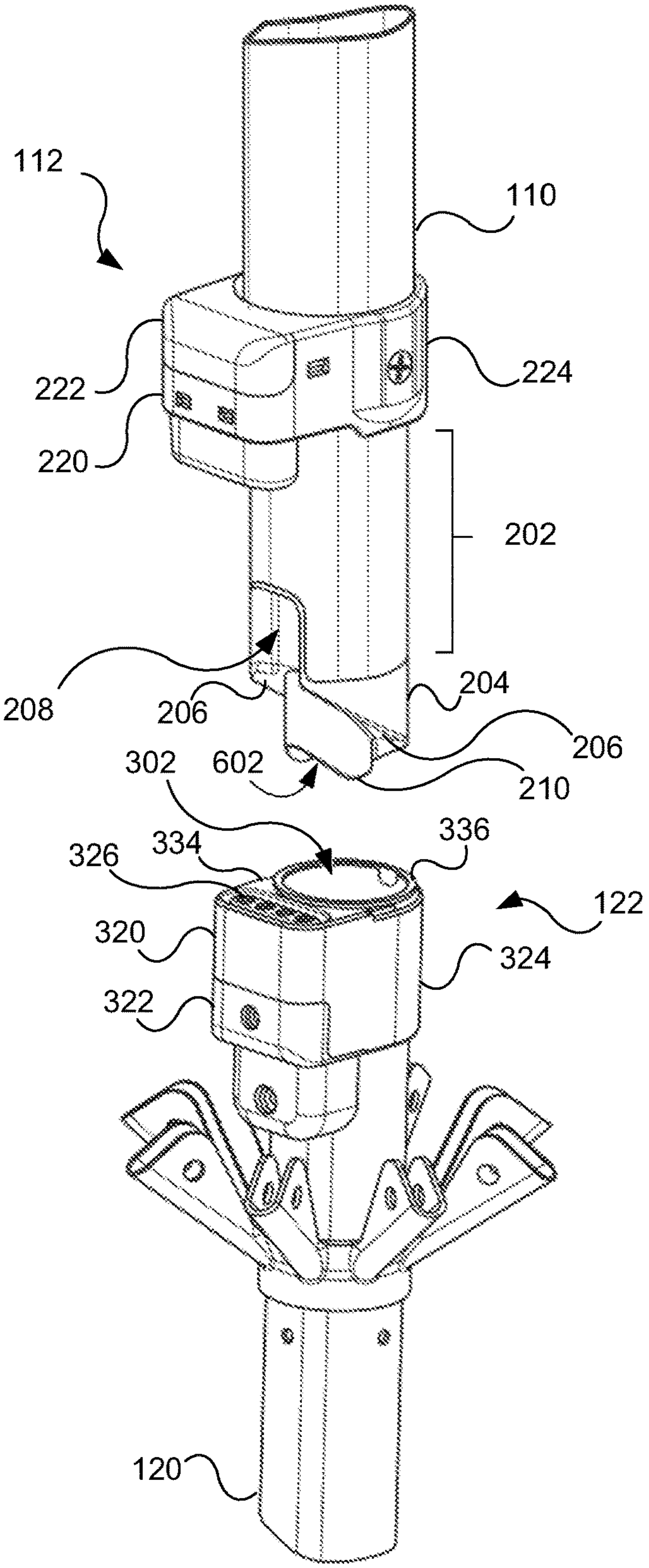
FIG. 6A depicts a perspective view of unassembled trunk sections having power distribution subsystems, in accordance with some embodiments of the present disclosure.
Figure 6B:
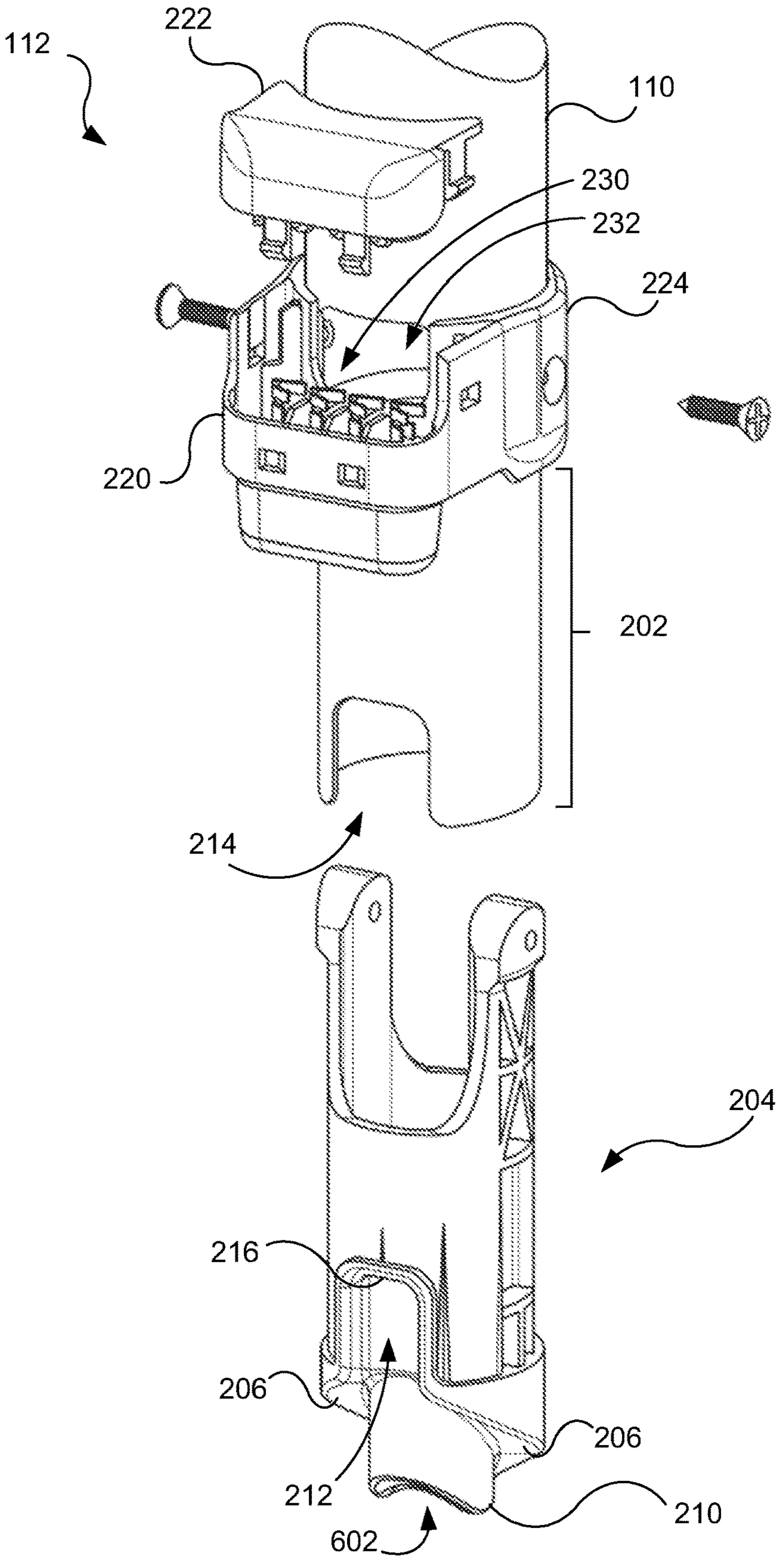
FIG. 6B depicts an exploded bottom view of a male end of a trunk section, in accordance with some embodiments of the present disclosure.
Figure 6C:
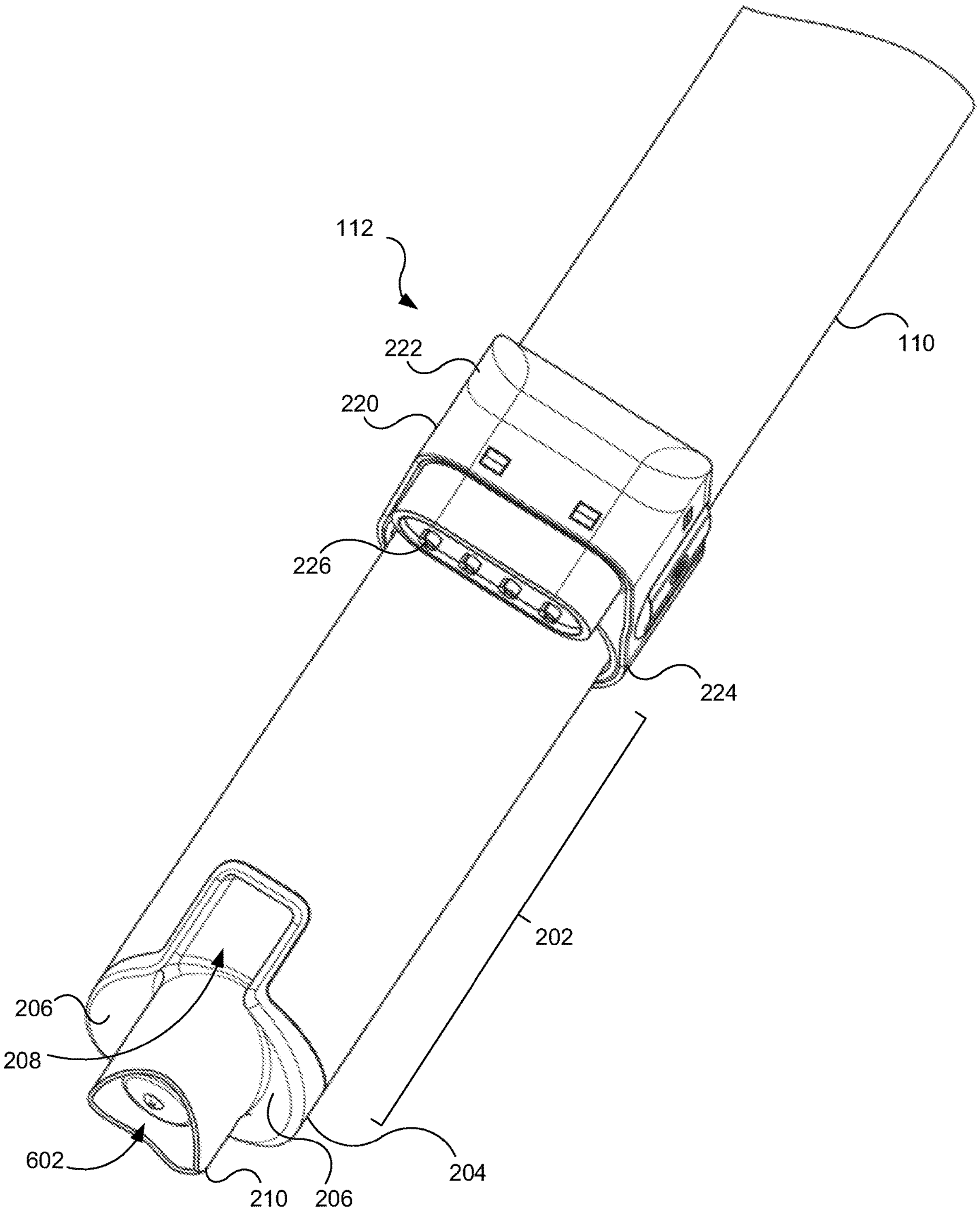
FIG. 6C depicts a bottom perspective view of a male end of a trunk section, in accordance with some embodiments of the present disclosure.

Referring to FIGS. 6A-6C, the tip 210 of the first mechanical coupler 204 can include a recess 602 at the distal end of the tip. The recess 602 can extend back into the tip 210 toward the first trunk section 110 when the first mechanical coupler 204 is inserted into or otherwise attached to the first trunk section 110. The recess 602 can be centrally located such that the recess 602 shares a central axis with the first trunk section 110.

Figure 6D:
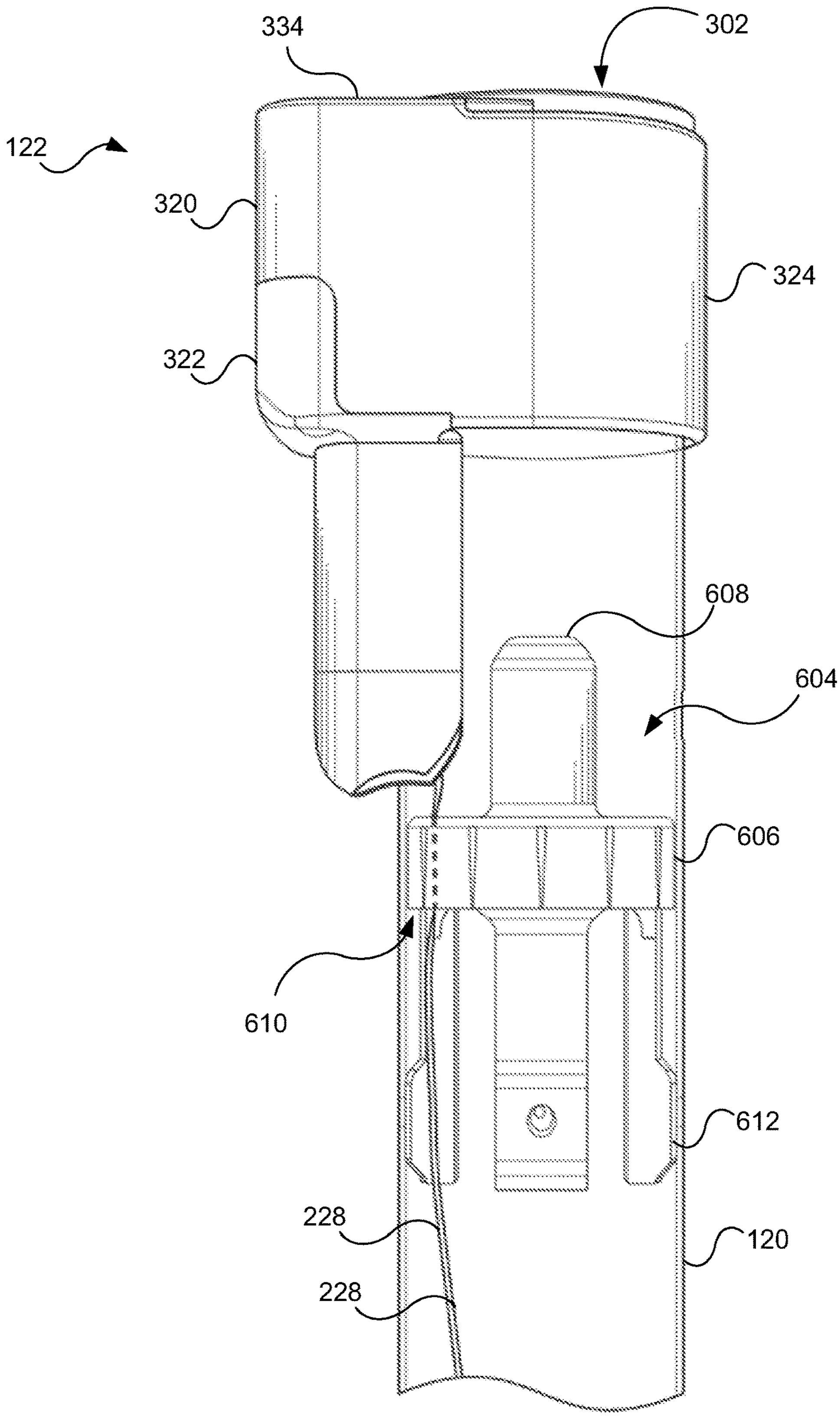
FIG. 6D depicts a side view of a female end of a trunk section with the trunk section shown as transparent for clarity of description, in accordance with some embodiments of the present disclosure.
Figure 6E:
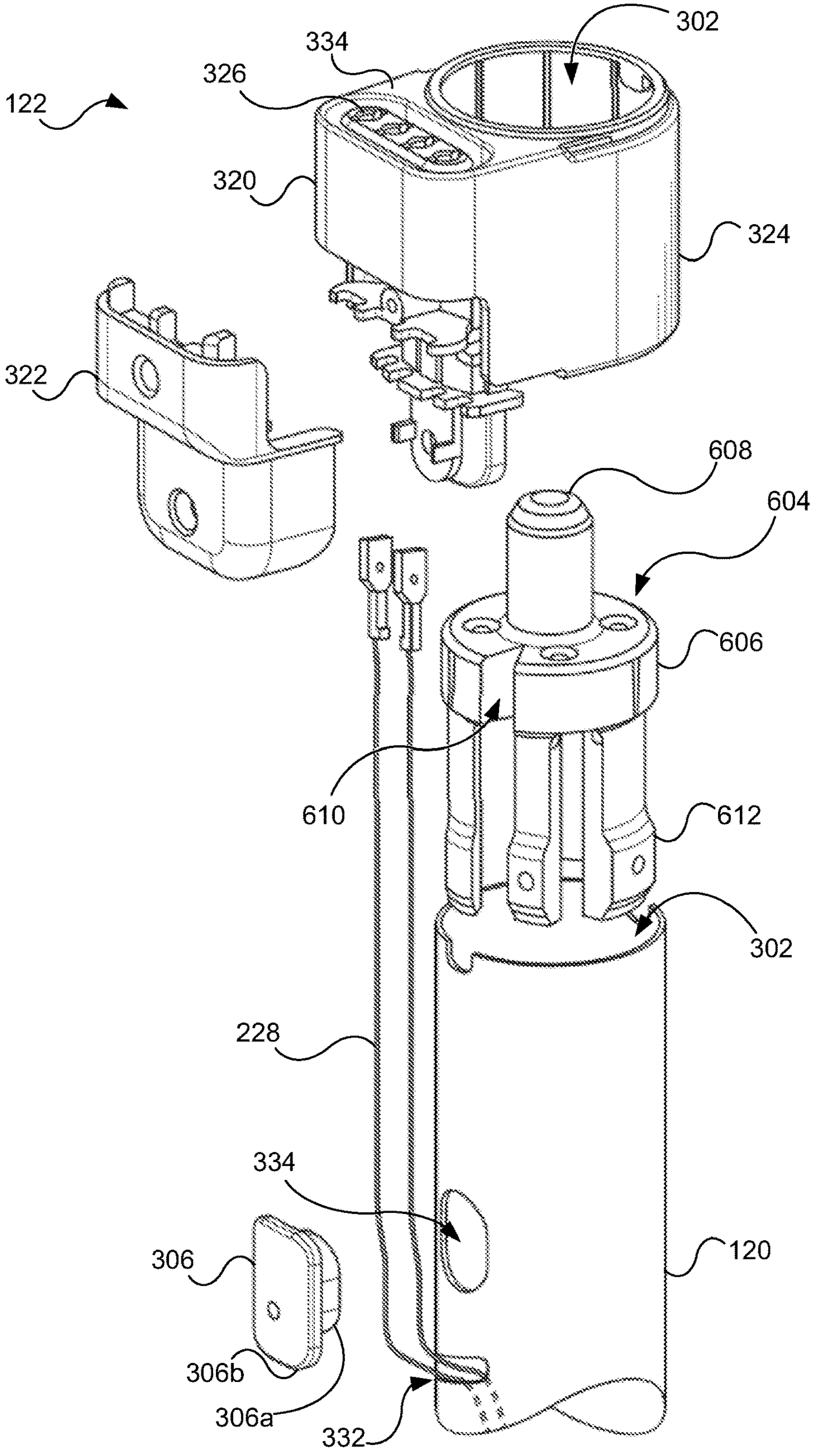
FIG. 6E depicts an exploded view of a female end of a trunk section, in accordance with some embodiments of the present disclosure.

Referring to FIGS. 6D and 6E, the second mechanical coupler can include an insert 604 that has a base 606 and a protrusion 608. The protrusion 608 can be centrally located such that the protrusion 608 shares a central axis with the second trunk section 120. The protrusion 608 can have an external diameter that is the same or less than the inner diameter of the recess 602 such that the recess 602 can at least partially receive the protrusion 608 when the first trunk section 110 and second trunk section 120 are mechanically coupled.

The insert 604 can include a wire channel 610 to permit the wires 228 from the second electrical connector 122 to pass the insert 604 and extend into the central portion of the second trunk section 120. As shown in FIG. 6E, the wire channel 610 can be a notch or cutout of the base 606 of the insert 604.

The insert 604 can have a diameter that is substantially the same as the interior diameter of the second trunk section 120 such that the insert 604 be attached to the second trunk section 120 by friction. The insert 604 can have a diameter that is substantially the same or less than the interior diameter of the second trunk section 120. Regardless, the insert 604 can attached to the second trunk section 120 by crimping, welding, or soldering or with an adhesive (e.g., glue, epoxy), a screw, a bolt, one or more rivets, a retaining clip, a detent and notch assembly (e.g., a protrusion extending from either the insert 604 or the second trunk section 120 and the remaining object including a notch, a hole, a depression, a lip, or any other feature configured to retain the protrusion, such as the detent 201 shown in FIG. 2C), or any other known attachment mechanisms or methods. The insert 604 can include one or more legs 612 that can extend deeper into the second trunk section 120 than the base 606 of the insert 604. The legs 612 may be biased such that the legs create an outer diameter that is the same or larger than the outer diameter of the base 606 and/or the inner diameter of the second trunk section 120. If the legs 612 create an outer diameter that is larger than the inner diameter of the second trunk section 120, the legs 612 can be configured to slightly flex upon insertion in the section trunk section 120. Thus, the legs 612 can be configured to provide a radially outward force against the inner wall of the second trunk section 120 and providing a frictional fit with the second trunk section 120 to retain the insert 604 in a predetermined position.

Figure 7A:
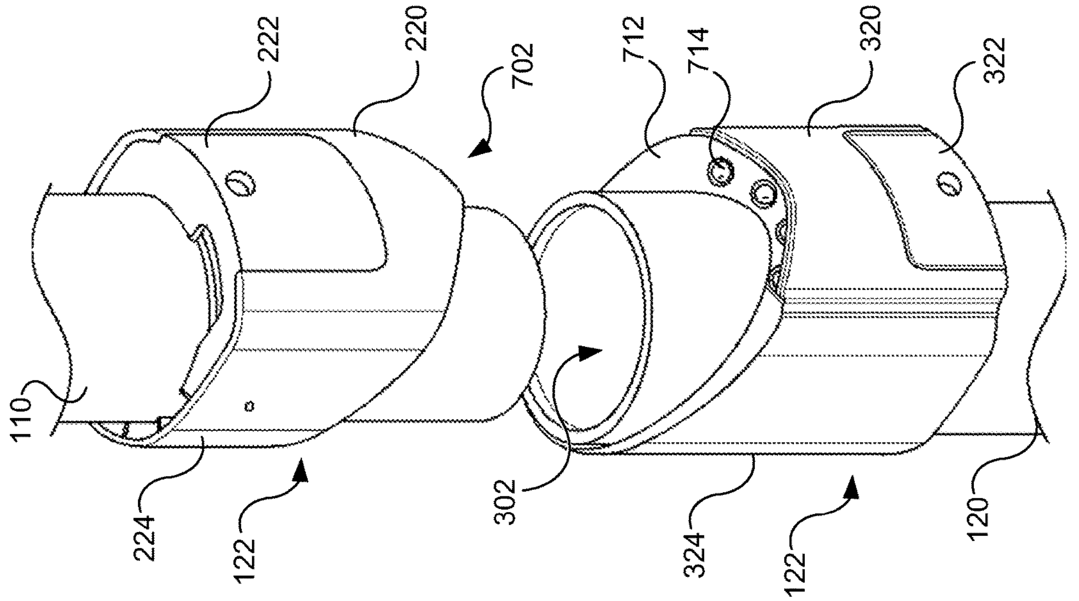
FIG. 7A depicts a perspective top view of unassembled trunk sections having power distribution subsystems, in accordance with some embodiments of the present disclosure.
Figure 7B:
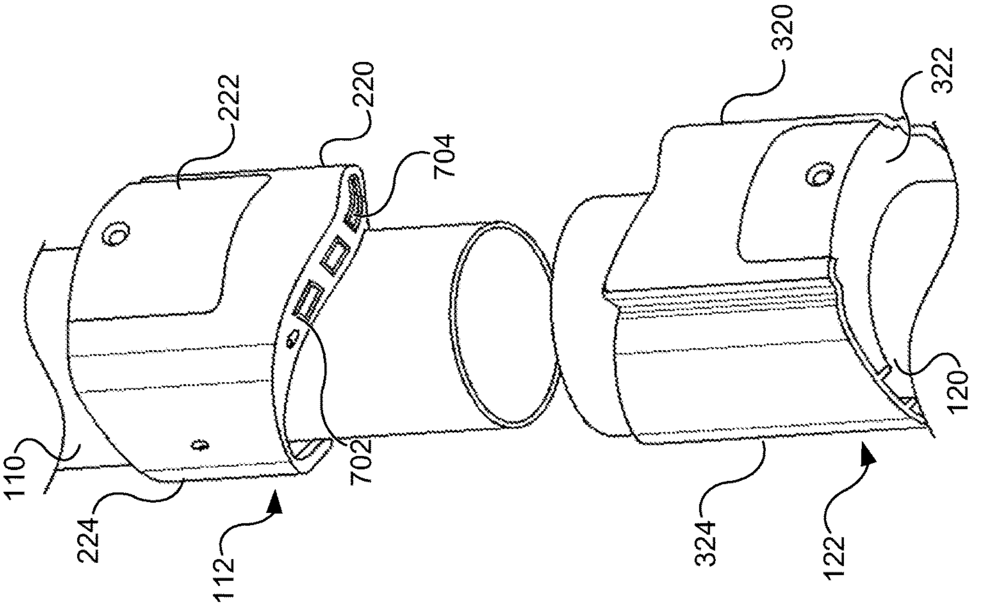
FIG. 7B depicts a perspective bottom view of unassembled trunk sections having power distribution subsystems, in accordance with some embodiments of the present disclosure.
Figure 7D:
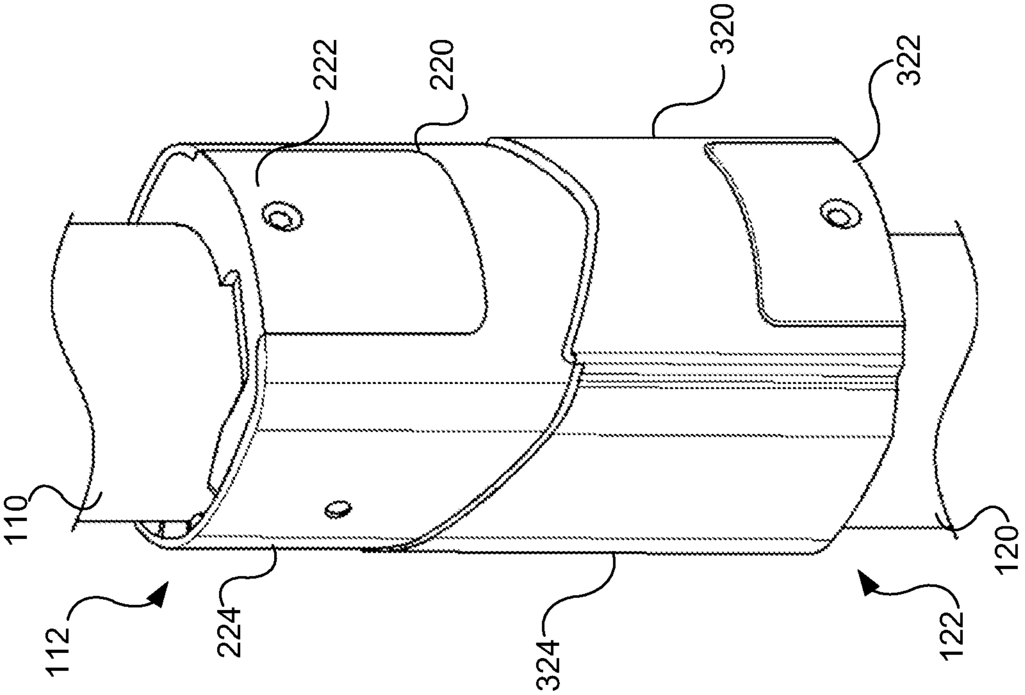
FIG. 7D depicts a perspective view of assembled trunk sections having power distribution subsystems, in accordance with some embodiments of the present disclosure.
Figure 7C:
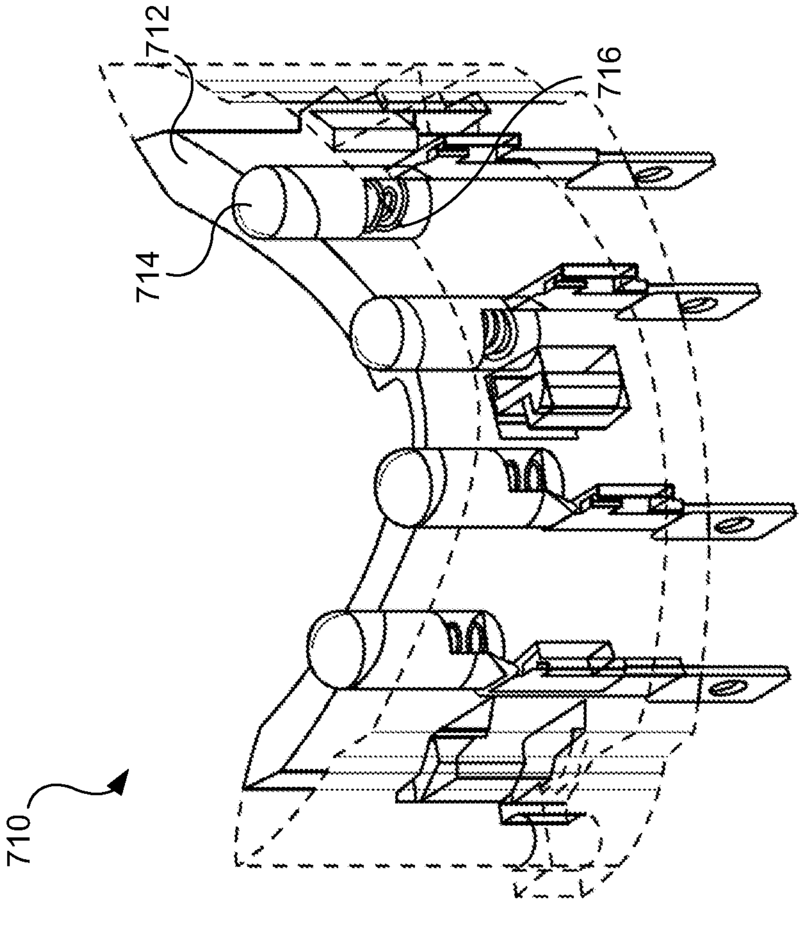
FIG. 7C depicts a perspective view of an electrical contact subassembly, in accordance with some embodiments of the present disclosure.

The first and second electrical connectors 112, 122 can include different types of electrical connectors. For example and as shown in FIGS. 7A-7D, the first electrical connector 112 can include a first mating surface 702 having first electrical contacts 704. The first electrical connector 112 can include two, three, four, or more first electrical contacts 704. The second electrical connector 122 can include a second mating surface 712 having second electrical contacts 714. The second electrical connector 122 can include the same number of second electrical contacts 714 as the first electrical connector 112 includes first electrical contacts 704. The first and second mating surface 702, 712 can both be an angled surface or a curved surface, such that, upon insertion of the extending portion 202 of the first trunk section 110 into the receiving portion 302 of the second trunk section 120, the first mating surface 702 can traverse the second mating surface 712 such that the first trunk section 110 is caused to rotate relative the second trunk section until the first electrical contacts 704 of the first electrical connector 112 establishes electrical communication with the second electrical contacts 614 of the second electrical connector 122. The angle or curve of the first mating surface 702 can be substantially similar to the angle or curve of the second mating surface 712. When the first and second electrical contacts 704, 714 are in electrical communication, the first trunk section 110 is a sole predetermined rotational alignment relative the second trunk section 120. Referring in particular to FIG. 7C, the second electrical contacts 714 can be included in an electrical contact subassembly 710. One, some, of all of the second electrical contacts 614 can include a spring 716. The springs 716 can help provide secure electrical communication between the first and second electrical contacts 704, 714. Various components, aspects, and functionalities of the mechanical coupler system (i.e., first mechanical coupler 204 and second mechanical coupler 304) can be incorporated into, or combined with, an artificial tree including the first and second electrical connectors 112, 122 depicted in FIGS. 7A-7D.

Figure 8A:
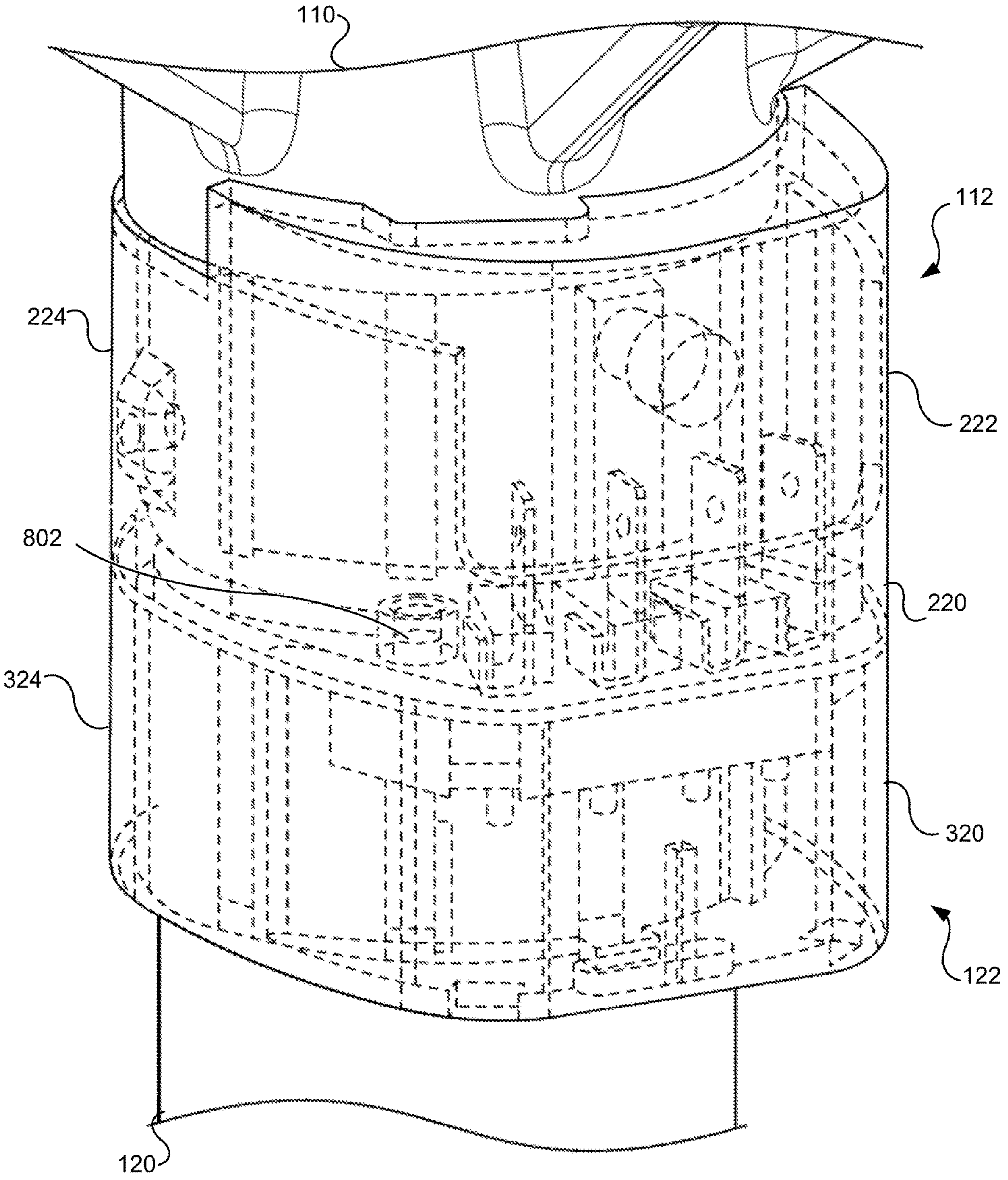
FIG. 8A depicts a perspective view of assembled trunk sections having power distribution subsystems, in accordance with some embodiments of the present disclosure.
Figure 8D:
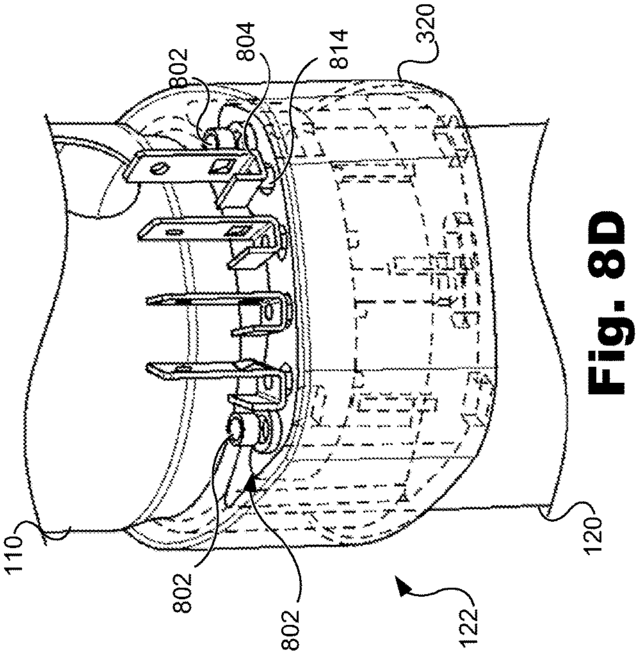
FIG. 8D depicts a perspective view of assembled trunk sections having power distribution subsystems with the body and wires of the first vertically-oriented electrical connector removed for clarity, in accordance with some embodiments of the present disclosure.
Figure 8C:
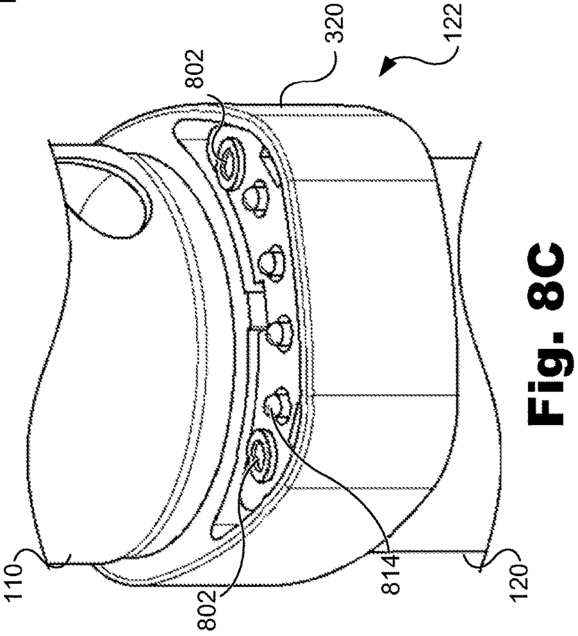
FIG. 8C depicts a perspective view of a second electrical connector, in accordance with some embodiments of the present disclosure.
Figure 8B:
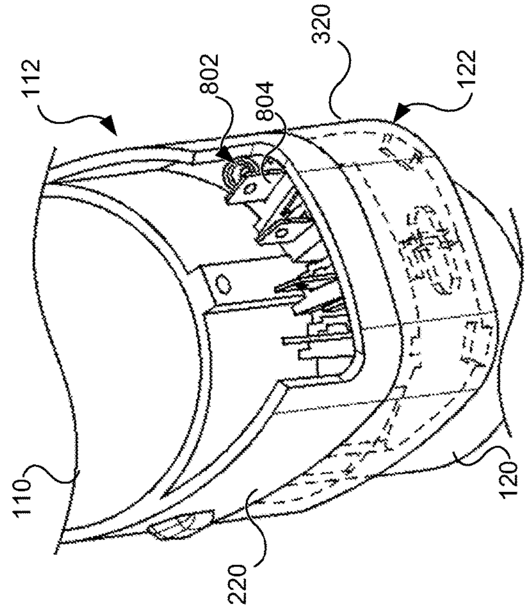
FIG. 8B depicts a perspective view of a partially disassembled first electrical connector, in accordance with some embodiments of the present disclosure.

FIGS. 8A-8C depict a first electrical connector 112 and a second electrical connector 122 in an assembled configuration. The first and second electrical connectors 112, 122 can be connected by one or more magnets 802. Referring particularly to FIGS. 8B and 8C, each of which omits portions of the first electrical connector 112 for clarity, the first electrical connector 112 can include first electrical contacts 804. Each first electrical contact 804 can include an attachment flange configured to connect to, and establish electrical communication with, a wire. The attachment flange can be in electrical communication with a contact portion of the first electrical contact 804, and the contact portion of the first electrical contact 804 can be configured to contact and establish electrical communication with a second electrical contact 814. As shown most clearly in FIG. 8D, the first electrical connector 112 can include one or more magnets 802.

Referring to FIG. 8C, the second electrical connector 122 can include one or more magnets 802. As will be appreciated, both of the first and second electrical connectors 112, 122 can include a magnet 802, or either the first or second electrical connector 112, 122 while the remaining electrical connector includes a ferromagnetic material to which the magnet 802 can adhere and/or establish a magnetic connection. As depicted in FIGS. 8A-8D, both the first and second connectors 112, 122 include two magnets 802, although any number of magnets 802 may be used, such as one, three, four, five, six, or more magnets 802. As depicted, the connectors 112, 122 include a magnet 802 on the left side and a magnet 802 on the right side of the respective electrical connectors 112, 122. Alternately, the first electrical connector 112 can include a first magnet 802 on the left side and the second electrical connector 122 can include ferromagnetic material in alignment with the first magnet 802, while the second electrical connector 122 can include a second magnet 802 on the right side and the first electrical connector 112 can include ferromagnetic material in alignment with the second magnet 802 (or vice versa). Various components, aspects, and functionalities of the mechanical coupler system (i.e., first mechanical coupler 204 and second mechanical coupler 304) can be incorporated into, or combined with, an artificial tree including the first and second electrical connectors 112, 122 depicted in FIGS. 8A-8D.

Figure 9A:
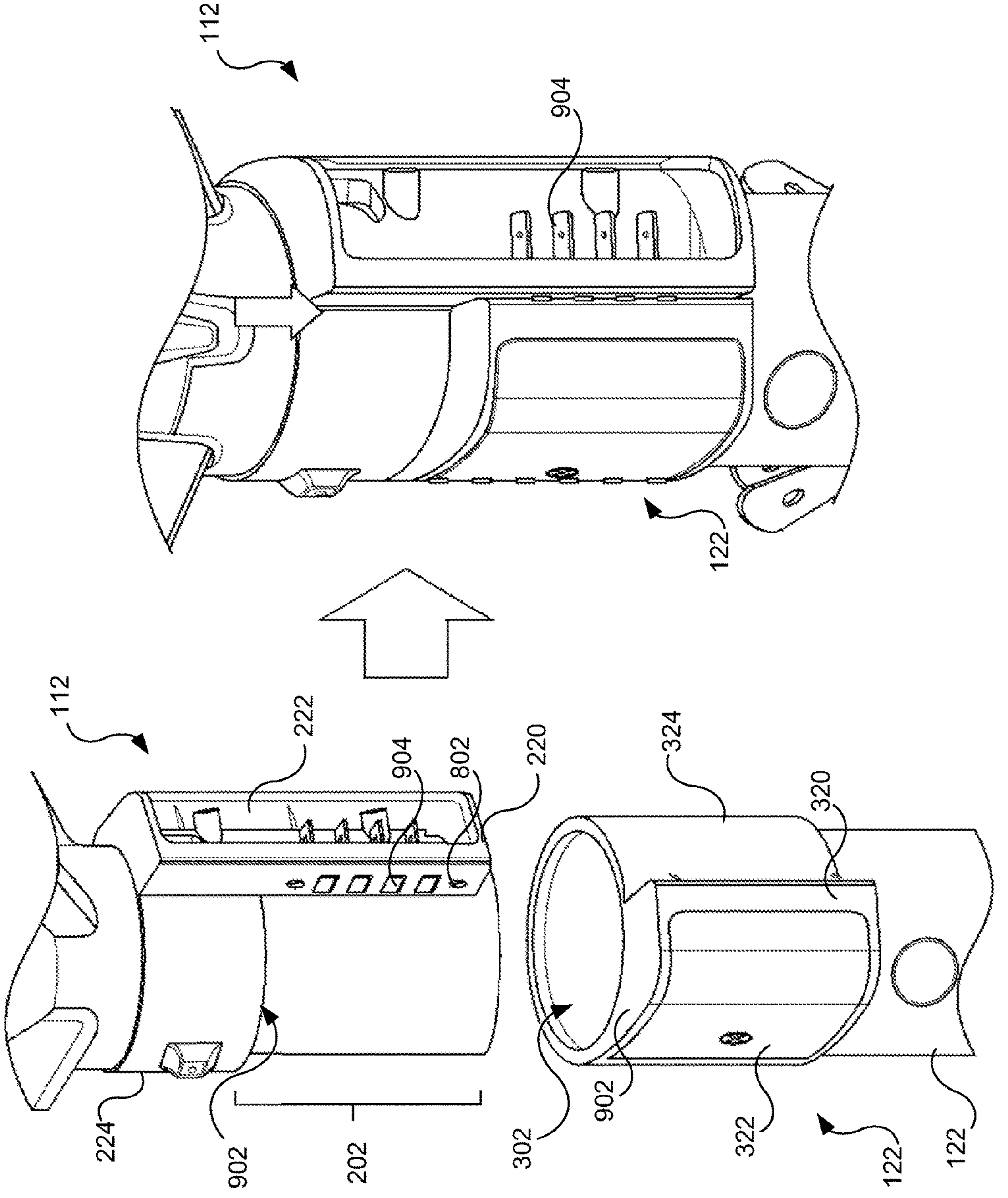
FIG. 9A depicts assembly of trunk sections having power distribution subsystems, in accordance with some embodiments of the present disclosure.
Figure 9B:
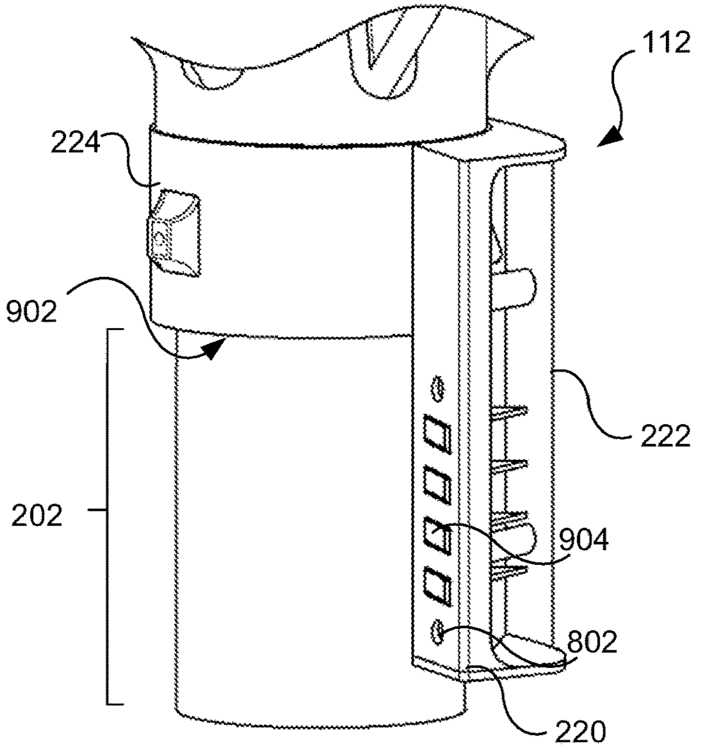
FIG. 9B depicts a first trunk section having a power distribution subsystem and a first electrical connector, in accordance with some embodiments of the present disclosure.
Figure 9C:
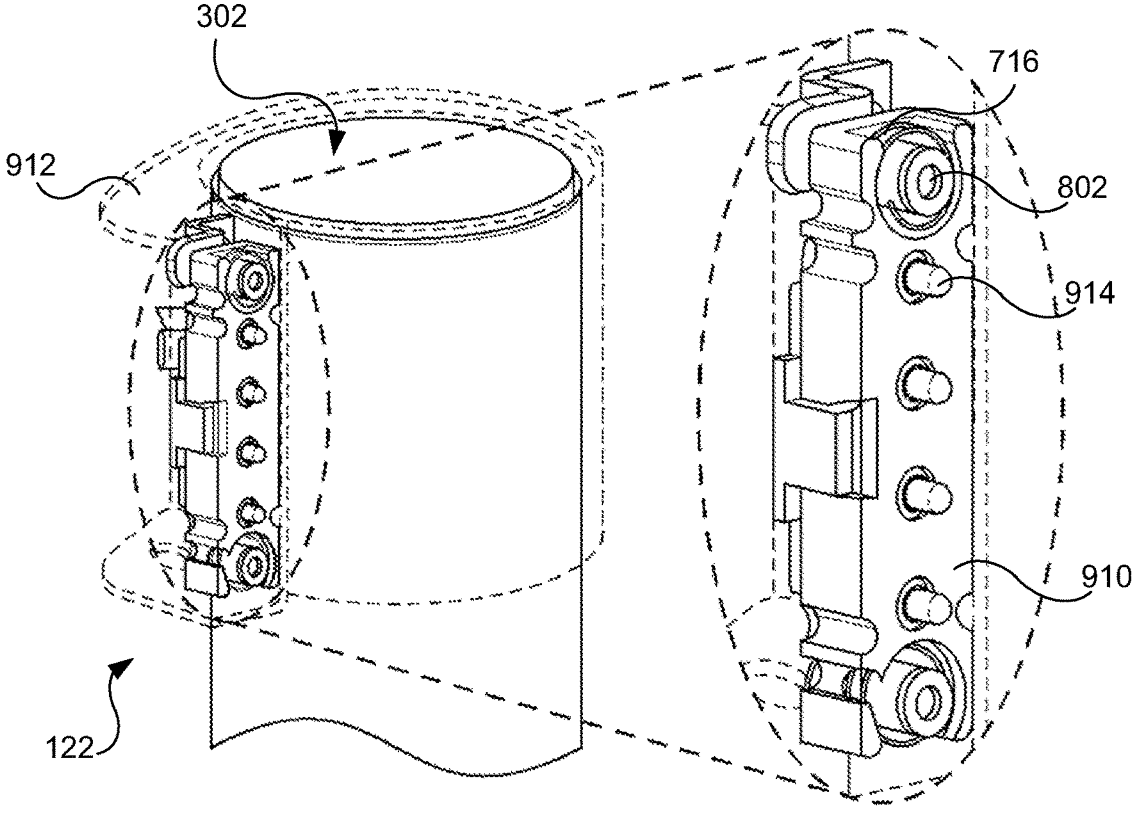
FIG. 9C depicts a second trunk section having a power distribution subsystem and a second electrical connector, in accordance with some embodiments of the present disclosure.

The first and second electrical connectors 112, 122 have been discussed hereto as involving contact or connections between electrical contacts of the first and second electrical connectors 112, 122 in an axial direction. Conversely, FIGS. 9A-9C depict first and second electrical connectors 112, 122 including electrical contacts 904, 914 configured to contact or connect in a transverse and/or tangential direction. As shown in FIG. 9A, the first trunk section 110 can be axially aligned with the second trunk section, and the extending portion 202 of the first trunk section 110 can be inserted into the receiving portion 302 of the second trunk section 120. Full insertion of the extending portion 202 into the receiving portion 302 can simultaneously cause each first electrical contact 904 to align with a corresponding second electrical contact 914. The first trunk section 110 can then be rotated relative the second trunk section 120 to establish contact and/or electrical communication between each aligned pair of first and second electrical contacts 904, 914.

The first electrical connector 112 can include an empty space of void between the housing 220 and the extending portion 202 of the first trunk section 110, which may permit the wall of the second trunk section 120 and the collar 324 of the second electrical connector 122 to pass between the housing 220 and the extending portion 202 such that the extending portion can extend into the receiving portion 302 of the second trunk section 120. Upon full insertion of the extending portion 202 into the receiving portion 302, a first mating surface 902 of the first electrical connector 112 (e.g., a bottom surface of the collar 224) can abut a second mating surface of the second electrical connector 122 (e.g., a top surface of the second electrical connector 122) such that further insertion of the extending portion 202 into the receiving portion 302 is prevented. Simultaneously, at full insertion, each pair of first and second electrical contacts 904, 914 is aligned such that rotation of the first trunk section 110 relative the second trunk section 120 causes each of the first electrical contacts 904 to connect or form an electrical connection with the corresponding second electrical contact 914. One or both of the first and second electrical connectors 112, 122 can include one or more magnets 802 to maintain the first and second electrical connectors in an attached configuration.

Referring in particular to FIG. 9C, the second electrical contacts 914 can be included in an electrical contact subassembly 910. The electrical contact subassembly can also include one or more magnets 802 and/or one or more springs 716. The springs 716 can push the electrical contact subassembly 910 in a direction away from the first electrical connector 112. Thus, when the first and second electrical connectors 112, 122 are attached, the magnet(s) 802 overcome the resisting force of the spring(s) 716 causing the spring(s) 716 to compress. Various components, aspects, and functionalities of the mechanical coupler system (i.e., first mechanical coupler 204 and second mechanical coupler 304) can be incorporated into, or combined with, an artificial tree including the first and second electrical connectors 112, 122 depicted in FIGS. 9A-9C. To facilitate incorporation of the components, aspects, and functionalities of the mechanical coupler system, the guiding surfaces 206 and/or the guiding slot 208 may form a guiding channel, which may follow a path about the first mechanical coupler 204 similar to a thread (e.g., a helical channel). The rotational direction of the guiding channel may facilitate mechanical coupling of the first mechanical coupler 204 to the second mechanical coupler 304 (via the guiding protrusion 306 and the guiding channel) while simultaneously aligning the first and second electrical contacts 904, 914 for establishing electrical communication between the first and second electrical connectors 112, 122.

As shown in FIGS. 10A-10D, the first trunk section 110 may include a hand grip 1002. In addition, a hand guard 1004 may be provided over or around the hand grip 1002. The hand guard may protect a user's hands from branches, lights, or other objects that may cause injury or discomfort to a user's hand as the user assembles neighboring trunk sections. The hand grip 1002 may be rotatably mounted to the first trunk section 110. This may permit the first trunk section to freely rotate while the hand grip 1002 is maintained in a single rotational position. Thus, when the first trunk section 110 includes both the hand grip 1002 and the first mechanical coupler 204, the first trunk section 110 may be permitted to freely rotate relative the second trunk section 120 without requiring the assembler to adjust his or her grip on the first trunk section 110.

Figure 11:
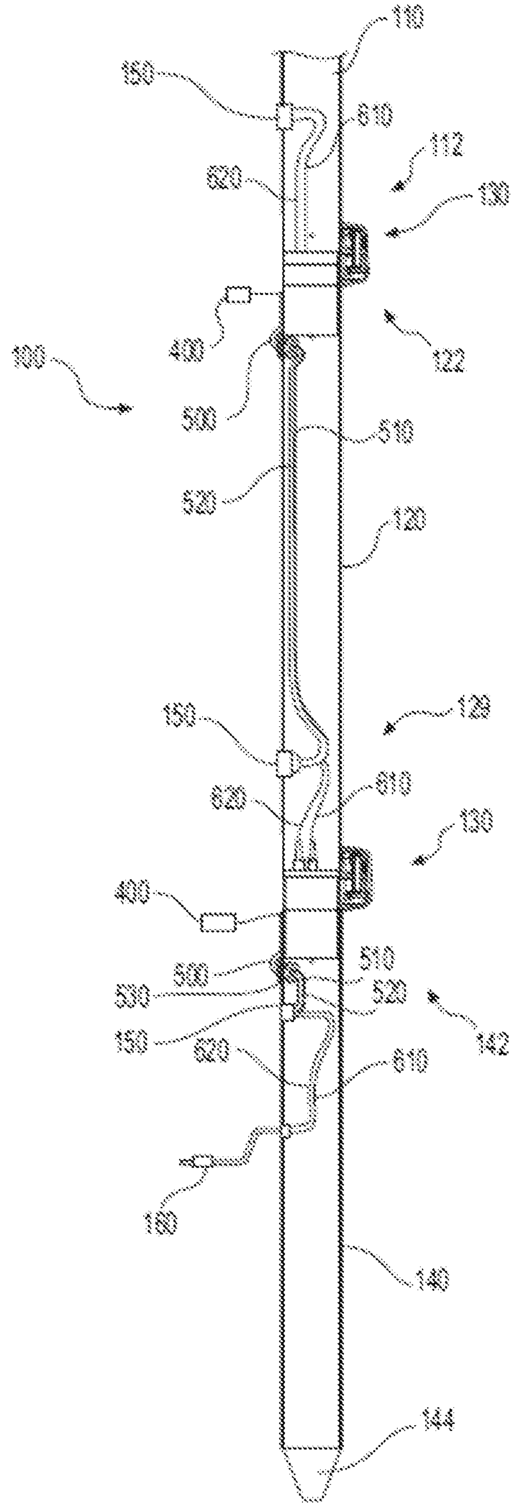
FIG. 11 depicts a cross-sectional side view of assembled trunk sections having power distribution subsystems, in accordance with some embodiments of the present disclosure.

FIG. 11 depicts a cross-section view of an example assembled trunk 100. As shown, the male end of the first trunk section 110 may be configured to mechanically attach to the female end of the second trunk section 120 via a first pair of the first and second mechanical couplers. Upon mechanical attachment of the first trunk section 110 to the second trunk section 120, the male end of the first trunk section 110 may be configured to establish electrical communication with the female end of the second trunk section 120 via a first pair of the first and second electrical connectors 112, 122 (shown as connected connector 130). The second trunk section 120 may also include a male end opposite the female end, and the male end of the second trunk section 120 may be configured to mechanically attach to a female end of a third trunk section 140 via a second pair of the first and second mechanical couplers. Upon mechanical attachment of the second trunk section 120 to the third trunk section 140, the male end of the second trunk section 120 may be configured to establish electrical communication with the female end of the third trunk section 140 via a second pair of the first and second electrical connectors (shown as connected connector 130). Additional trunk sections (e.g., a fourth, fifth, and so on) may similarly mechanically attach or couple and similarly establish electrical communication with adjacent trunk sections, as there may be any number of trunk sections to create a tree of any size. In this configuration, power distribution subsystems disposed in different trunk sections 110, 120, 140, etc. of the trunk 100 may be electrically connected. The first trunk section 110 may have wires 228 disposed within, which may be connected to electrical contacts of a corresponding first and/or second electrical connector 112, 122. The electrical contacts of one electrical connector 112, 122 may be configured to pass a flow of electricity from the wires 228 to the electrical contacts of an adjacent electrical connector 112, 122 where the 228 are partially disposed within the corresponding trunk section. A flow of electricity may similarly be passed between other pairs of electrical connector 112, 122. The wires 228 may be configured to pass a flow of electricity to one or more electrical power outlets or sockets 150 and may be connected to additional wires 228. Proximate the lowermost trunk section (when in an upright, assembled configuration—as shown), the third trunk section 140 may include a power cord 160 extending from the trunk 100 and connectable to an external power source (e.g., a wall outlet). Thus, the wires 228, as part of the power distribution subsystems, may enable power to flow from a power source through the tree and to certain pluggable accessories, such as a one or more lights or strands of lights. The lights or strands of lights can therefore be illuminated when power is supplied to the tree via the power cord 160.

The one or more electrical power outlets or sockets 150, which may be provided along the length of the assembled trunk 100, may be configured to receive power from wires 228 to provide a user with the ability to plug in devices, such as tree lights or other electrical components. By providing a convenient location to plug in lights, electrical power outlets or sockets 150 can minimize the amount of effort required to decorate a tree. More specifically, a user can plug a strand of lights directly into an electrical power outlet 150 (or electrically couple the strand of light to an electrical socket 150) on a trunk section 100, instead of having to connect a series of strands together, which can be cumbersome and frustrating for a user.

The present disclosure can further comprise strands of lights that are unitarily integrated with the power transfer system. Thus, the lights can be connected to the wires 228 without the need for electrical power outlets or sockets 150, although the electrical power outlets or sockets 150 can be optionally included. Such designs can be desirable for trees that come pre-strung with lights (e.g., a lighted artificial tree design), for example.

As noted above, one or more sections of the trunk 100 can include the power cord 160 for receiving power from an outside power source, such as a wall outlet. The power cord 160 may be configured to engage a power source and distribute power to the rest of the tree. More specifically, power can flow from the wall outlet, through the power cord 160, through the one or more power distribution subsystems disposed within the trunk 100, and to accessories on the tree, such as lights or strands of lights. The power cord 160 can be located on a lower trunk section of the tree for reasons of convenience and appearance, i.e., the power cord 160 is close to the wall outlets and exits the tree at a location that is not immediately visible.

Figure 10D:
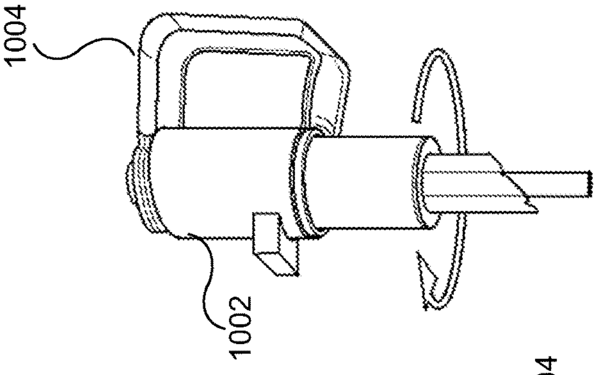
FIG. 10D depicts a trunk section including a handle, in accordance with some embodiments of the present disclosure.
Figure 10B:
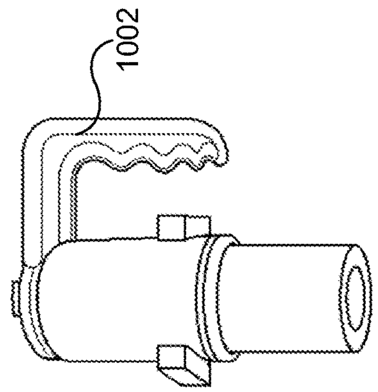
FIG. 10B depicts a trunk section including a handle, in accordance with some embodiments of the present disclosure.
Figure 10C:
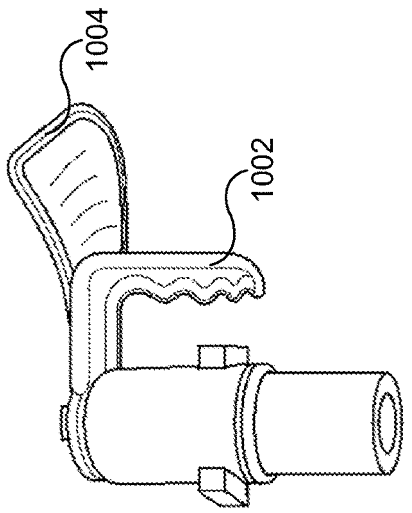
FIG. 10C depicts a trunk section including a handle, in accordance with some embodiments of the present disclosure.
Figure 10A:
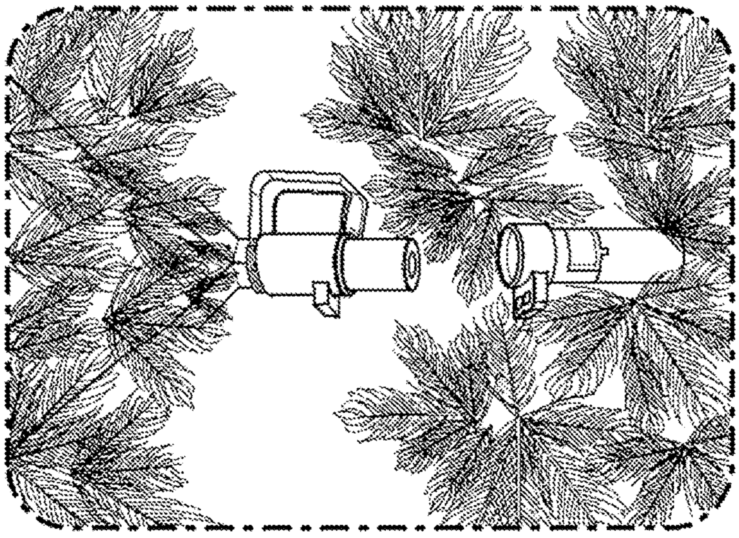
FIG. 10A depicts a trunk section including a handle, in accordance with some embodiments of the present disclosure.

The present disclosure can also comprise a bottom section 144 of one or more trunk sections (e.g., the bottommost trunk section) of the trunk 100. As shown in FIGS. 10A and 10B, the bottommost trunk section (e.g., the third trunk section 140) has a female end proximate its top end, and the bottom section in lieu of a male end at its bottom end. The bottom section 144 can be substantially conical in shape and can be configured to engage a stand for the tree (not shown). Accordingly, the bottom section 144 can be inserted into the stand, and the stand can support the tree, usually in a substantially vertical position. Correspondingly, the uppermost trunk section of the trunk 100 (e.g., the first trunk section 110) may have a male end proximate its bottom end and may not have a female end proximate its top end. Instead of having a female end, the top end of an uppermost trunk section may be configured to resemble an upper portion of a tree or attachably receive a top cover that resembles an upper portion of a tree.

It can be advantageous for a lowest trunk section of a trunk 100 (i.e., truck section 140) to comprise a female end of a power distribution subsystem. During assembly, a male end of a power distribution subsystem of a neighboring trunk section 120 can be joined with the female end of the lowest trunk section. This can improve safety during assembly because the exposed male prongs are not energized, i.e., they do not have electricity flowing through them until they are inserted into the female end. To the contrary, if the lowest trunk section comprises a male end, energized prongs can be exposed, and accidental electrical shock can result. Ideally, the power cord 160 may not be plugged into a wall outlet until the tree is fully assembled, but the present disclosure is designed to minimize the risk of injury if the tree is plugged in prematurely.

In addition, all of the trunk sections can be configured so that the male end may be proximate a bottom end of each trunk section, and the female end is the top end. In this manner, if power cord 160 is plugged in during assembly, the risk of injury is minimized because energized male prongs are not exposed. Further, it may be easier to stack the male end of each trunk section into the female end of the lower trunk section during assembly. Alternately, however, the male end may be proximate a top end of each trunk section, and the female end may be proximate a bottom end of each trunk section.

Figure 12:
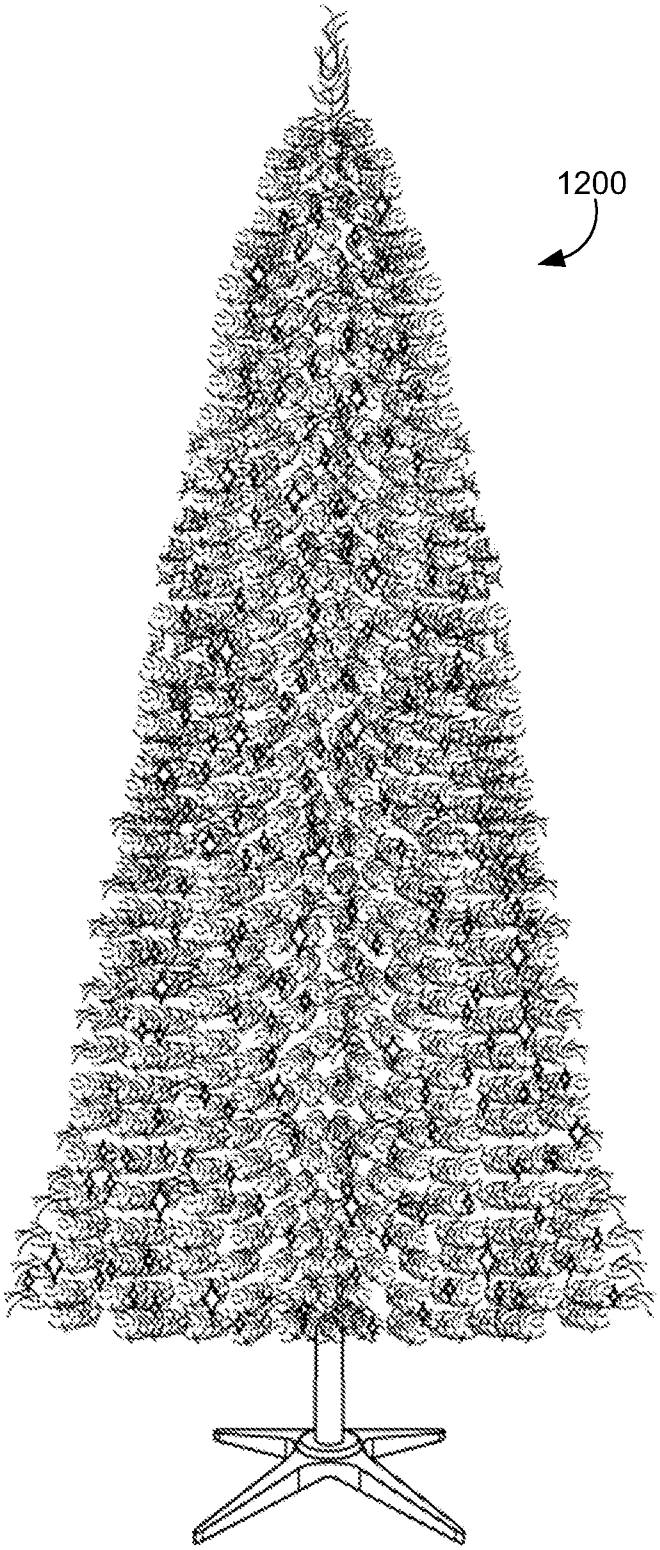
FIG. 12 depicts an assembled artificial Christmas tree, in accordance with some embodiments of the present disclosure.

FIG. 12 shows an assembled tree 1200 in accordance with some of the features of the present disclosure. The tree 1200 may have been assembled by mechanically coupling various sections of the trunk 100 as described herein such that the various sections are detachably attached and also electrically connected such that electricity can travel between neighboring trunk section. The tree 1200 can be decorated as desired with electronic and non-electronic decorations. A person having skill in the art would understand that the assembled trunk sections of the trunk 100 may be positioned proximate the central vertical axis of the tree 1200, that a plurality of branches may attach to the trunk sections of the trunk 100 to resemble a natural tree, and that lights may be strung on or in (or otherwise attached to) the branches to decorate the tree 1200.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An artificial tree system comprising:
- a first trunk section having an elongate body, the first trunk section including:
- a first end;
  - an extending portion from at least a portion of the first trunk section elongate body, the extending portion having an outer diameter and including a slot axially extending from the first end;
  - a first electrical connector disposed on an outer surface of the first trunk section, the first electrical connector comprising a first plurality of electrical contacts; and
- a first mechanical coupler system disposed at least partially within the elongate body of the first trunk section, the first mechanical coupler system comprising:

a first insert at least partially disposed within the first end of the first trunk section, the first insert including a guiding slot aligned with the slot of the extending portion of the first trunk section to form a guiding channel; and a second trunk section having an elongate body, the second trunk section including:

a second end;

a receiving portion extending axially from the second end, the receiving portion having an inner diameter that is greater than an outer diameter of at least a portion of the first trunk section elongate body such that the receiving portion can receive at least a portion of the extending portion of the first trunk section elongate body;

a second electrical connector disposed on an outer surface of the second trunk section, the second electrical connector including a second plurality of electrical contacts; and a second mechanical coupler system disposed at least partially within the second end of the second trunk section, wherein the first trunk section is configured to engage the second trunk section such that, as the first mechanical coupler system engages the second mechanical coupler system, the first mechanical coupler system can rotate relative the second mechanical coupler system, thereby rotating the first trunk section into a final rotational alignment position such that each electrical contact of the first plurality of electrical contacts is aligned with a respective electrical contact of the second plurality of electrical contacts.

2. The artificial tree system of claim 1, wherein the first trunk section further comprises a handle.

3. The artificial tree system of claim 2, wherein the handle is rotatable with respect to the first trunk section.

4. The artificial tree system of claim 1, the first insert further comprising an outer diameter less than or equal to the outer diameter of the extending portion, the first insert further including:

a guiding surface angled toward the guiding slot, and a tip having a recess.

5. The artificial tree system of claim 4, wherein the tip of the first insert protrudes outwardly from the first insert.

6. The artificial tree system of claim 4, wherein the extending portion having an outer diameter and including a slot axially extending from the first end and wherein the guiding slot is aligned with the slot of the extending portion of the first trunk section to form a guiding channel.

7. The artificial tree system of claim 6, wherein the second mechanical coupler system comprises a second insert including a protrusion, the protrusion having a diameter less than a diameter of the of the recess of the first insert such that the protrusion is configured to extend at least partially into the recess.

8. The artificial tree system of claim 7, wherein the second mechanical coupler system further comprises a guiding protrusion disposed within the receiving portion and extending radially inward from an interior side of a wall of the second trunk section, the guiding protrusion configured to align with, and at least partially insert into, the guiding channel such that, when the guiding protrusion is aligned with guiding channel, each electrical contact of the first plurality of electrical contacts is aligned with a respective electrical contact of the second plurality of electrical contacts and, when the receiving portion at least partially receives the insert and/or the extending portion, each electrical contact of the first plurality of electrical contacts forms an electrical connection with the respective electrical contact of the second plurality of electrical contacts.

9. The artificial tree system of claim 7, wherein the second insert further includes a plurality of legs configured to flex and, upon insertion of the second insert into the second trunk section, provide pressure against an inner wall of the second trunk section in a radially outward direction to retain the second insert at a predetermined position within the second trunk section.

10. The artificial tree system of claim 1, wherein each electrical contact of the first plurality of electrical contacts is in electrical communication with one or more first wires and each contact of the second plurality of electrical contacts is in electrical communication with one or more second wires.

11. The artificial tree system of claim 10, wherein the one or more first wires are at least partially disposed within the first trunk section and the one or more second wires are at least partially disposed within the second trunk section.

12. The artificial tree system of claim 8, wherein the guiding protrusion has a protruding portion and a base portion and the second trunk section includes a hole in the wall of the second trunk section, the base portion of the guiding protrusion abutting the outer surface of the second trunk section and the protruding portion of the guiding protrusion extending through the hole, wherein the second electrical connector is attached to the second trunk section such that at least a portion of the second electrical connector abuts at least a portion of the base portion of the guiding protrusion such that the protruding portion of the guiding protrusion is retained in the hole.

13. A method of electrically and mechanically coupling a first trunk section of a lighted artificial tree to a second trunk section of the lighted artificial tree, the method comprising:

positioning a first trunk section upright along a vertical axis, the first trunk section having:

a receiving portion having a first diameter;

a first electrical connector disposed on an outer surface of the first trunk section, the first electrical connector including a first plurality of electrical contacts; and a first mechanical coupler system comprising:

a guiding protrusion disposed within the receiving portion and extending radially inward from an inner surface of the first trunk section; and an insert disposed within the first trunk section, the insert having a protrusion;

aligning a second trunk section with the first trunk section and along the vertical axis, the second trunk section having:

a second electrical connector disposed on an outer surface of the second trunk section, the second electrical connector including a second plurality of electrical contacts; and a second mechanical coupler system;

causing the second trunk section to move axially such that a first end of the first trunk section receives a second end of the second trunk section and a first trunk wall of the first trunk section is engaged with a second trunk wall of the second trunk section;

causing the second mechanical coupler system to initially contact the first mechanical coupler system at a first rotational alignment of the second trunk section with respect to the first trunk section; and allowing the second mechanical coupler system to rotate relative the first mechanical coupler system, thereby rotating the second trunk section into a second rotational alignment and a final rotational alignment position such that each electrical contact of the second plurality of electrical contacts is aligned with a respective electrical contact of the first plurality of electrical contacts.

14. The method of claim 13, wherein the second mechanical coupler system comprises (i) a guiding slot aligned with a slot of an extending portion of the second trunk section to form a guiding channel and (ii) an alignment mechanism with a sloped engagement portion angled toward the guiding channel, the alignment mechanism including a recess configured to at least partially receive the protrusion of the insert of the first mechanical coupler system.

15. The method of claim 14, wherein the second electrical connector is disposed at a distance from the second end of the second trunk section such that the extending portion of the second trunk section is defined between at least a portion of the second electrical connector and the second end, the extending portion (i) having a second diameter that is less than the first diameter such that the extending portion can at least partially insert into the receiving portion and (ii) including a slot axially extending from the second end.

16. The method of claim 14, wherein causing the second mechanical coupler system to initially contact the first mechanical coupler system comprises causing the sloped engagement portion of the alignment mechanism of the second mechanical coupler system to initially contact the guiding protrusion of the first mechanical coupler system at a first rotational alignment of the second trunk section with respect to the first trunk section.

17. The method of claim 14 further comprising, subsequent to each electrical contact of the second plurality of electrical contacts being aligned with the respective electrical contact of the first plurality of electrical contacts, allowing (i) the protrusion of the insert of the first mechanical coupler to insert into the recess of the alignment mechanism of the second mechanical coupler and (ii) the guiding protrusion to traverse at least a portion of the guiding channel, thereby inserting the second end of the second trunk section into the first end of the first trunk section such that the first trunk section and second trunk section are mechanically coupled and the first and second plurality of electrical contacts are electrically connected.

18. An electrical and mechanical coupling system for artificial tree trunk portions comprising:

a first electrical connector configured to be disposed about a first artificial tree trunk portion, the first electrical connector comprising:

a first housing, and a first plurality of electrical contacts disposed at least partially within the first housing;

a first mechanical coupler system configured to be at least partially disposed within the first artificial tree trunk portion, the first mechanical coupler system comprising:

a guiding protrusion disposed within the first artificial tree trunk portion and extending radially inward from an inner surface of the first artificial tree trunk portion; and an insert disposed within the first artificial tree trunk portion, the insert having a protrusion;

a second electrical connector configured to be disposed about a second artificial tree trunk portion, the second electrical connector comprising:

a second housing, and a second plurality of electrical contacts disposed at least partially within the second housing; and a second mechanical coupler system configured to be at least partially disposed within the second artificial tree trunk portion, wherein the first mechanical coupler system is configured to engage the second mechanical coupler system such that the first mechanical coupler system can rotate relative the first mechanical coupler system, thereby rotating the first electrical connector into a final rotational alignment position such that each electrical contact of the first plurality of electrical contacts is aligned with and in contact with a respective electrical contact of the second plurality of electrical contacts.

19. The electrical and mechanical coupling system of claim 18, wherein the first mechanical coupler system comprises a sloped surface and the second mechanical coupler system comprises a protrusion.

* * * * *